US012811451B2

(12) United States Patent
Pandya et al.

(10) Patent No.: US 12,811,451 B2
(45) Date of Patent: Nov. 24, 2026

(54) ELECTRIC MOTOR WITH ROTOR HAVING AXIAL COOLING CHANNEL

(71) Applicant: Atieva, Inc., Newark, CA (US)

(72) Inventors: Yajat Vedant Pandya, Fremont, CA (US); Mahsaalsadat Mortazavi Ravari, Redwood City, CA (US); Calahan Benjamin Campton, Fremont, CA (US); Shun-Cheng Hung, Taipei (TW); Shuqi Cheng, Fremont, CA (US); Mingda Liu, Sunnyvale, CA (US)

(73) Assignee: Atieva, Inc., Newark, CA (US)

( * ) Notice: Subject to any disclaimer, the term of this patent is extended or adjusted under 35 U.S.C. 154(b) by 147 days.

(21) Appl. No.: 18/655,988

(22) Filed: May 6, 2024

(65) Prior Publication Data

US 2025/0343457 A1 Nov. 6, 2025

(51) Int. Cl.
*H02K 1/32* (2006.01)

(52) U.S. Cl.
CPC .................................... *H02K 1/32* (2013.01)

(58) Field of Classification Search
CPC ............ H02K 9/19; H02K 1/32; H02K 1/276; H02K 1/33; H02K 1/2766
See application file for complete search history.

(56) References Cited

U.S. PATENT DOCUMENTS 5,189,325 A 2/1993 Jarczynski
9,762,106 B2 9/2017 Gauthier et al.
10,903,701 B2 1/2021 Dlala et al.
11,469,634 B2 * 10/2022 Yang .................. F04C 29/0078
11,535,097 B2 12/2022 Dlala et al.
2003/0030333 A1 * 2/2003 Johnsen .................. H02K 1/32 310/54
2017/0012503 A1 * 1/2017 Okochi .................. H02K 1/32
2020/0220432 A1 7/2020 Chernogorski (Continued)

FOREIGN PATENT DOCUMENTS

CN 115864747 A * 3/2023 ............ H02K 7/006
DE 102011117517 A1 5/2013
WO 2023076799 A1 5/2023

OTHER PUBLICATIONS

CN-115864747-A machine translation Jan. 10, 2026.*

(Continued)

*Primary Examiner* — Leda T Pham
(74) *Attorney, Agent, or Firm* — Brake Hughes Bellermann LLP

(57) ABSTRACT

An electric motor comprises: a stator; a rotor shaft having a hollow interior and a rotor axis with at least one inlet into the hollow interior and at least one outlet from the hollow interior to an outer diameter of the rotor shaft; a rotor comprising: a rotor body having a first end structure and a second end structure opposite each other along the rotor shaft, wherein the second end structure has an outlet to an outside of the rotor; and an axial cooling channel extending through the rotor body; and wherein the electric motor is configured so that a fluid is centrifugally driven by rotation of the rotor to enter through the inlet of the rotor shaft, exit through the outlet of the rotor shaft, enter the axial cooling channel, and flow to the outside of the rotor through the outlet of the second end structure.

20 Claims, 18 Drawing Sheets

(56) References Cited

U.S. PATENT DOCUMENTS

| | | | |
|---|---|---|---|
| 2021/0399609 | A1 | 12/2021 | Hung et al. |
| 2024/0006943 | A1 | 1/2024 | Mortazavi Ravari et al. |

OTHER PUBLICATIONS

International Search Report and Written Opinion for PCT Application No. PCT/US2025/027466, mailed on Jul. 24, 2025, 17 pages.

* cited by examiner

ELECTRIC MOTOR WITH ROTOR HAVING AXIAL COOLING CHANNEL

TECHNICAL FIELD

This document relates to an electric motor with a rotor having an axial cooling channel.

BACKGROUND

In recent years, the world's transportation has begun a transition away from powertrains primarily driven by fossil fuels and toward more sustainable energy sources. The majority of such increasingly prevalent powertrains include electric motors powered by on-board energy storages. Electric motors generate heat during operation, and their efficiency and other performance characteristics in part depend on the thermal control strategy.

SUMMARY

In an aspect, an electric motor comprises: a stator; a rotor shaft having a hollow interior and configured for rotation inside the stator about a rotor axis, the rotor shaft having at least one inlet into the hollow interior and at least one outlet from the hollow interior to an outer diameter of the rotor shaft; a rotor comprising: a rotor body having a first end structure and a second end structure opposite each other along the rotor shaft, wherein the second end structure has an outlet to an outside of the rotor; and an axial cooling channel extending through the rotor body; and wherein the electric motor is configured so that a fluid is centrifugally driven by rotation of the rotor to enter through the inlet of the rotor shaft, exit through the outlet of the rotor shaft, enter the axial cooling channel, and flow to the outside of the rotor through the outlet of the second end structure.

Implementations can include any or all of the following features. The rotor has multiple axial cooling channels extending through the rotor body, the multiple axial cooling channels substantially parallel with each other. Each of the multiple axial cooling channels has substantially a same radial distance from the rotor axis. The multiple axial cooling channels have a common spacing between all adjacent ones of the multiple axial cooling channels. The rotor body comprises a stack of rotor laminations. The rotor laminations consist of only a first type of lamination and a second type of lamination. The outlet of the second end structure is positioned radially inward of the axial cooling channel and radially outward of the outlet of the rotor shaft. The first and second end structures are formed of the second type of lamination. The second type of lamination is used only at ends of the rotor body, as the first and second end structures, and in an axial center of the rotor body, and wherein a remainder of the rotor body is formed of instances of the first type of lamination. A beginning of the axial cooling channel is at the first end structure and an end of the axial cooling channel opposite the beginning is at the second end structure. The fluid enters the axial cooling channel through a radial passage at a center of the axial cooling channel along the rotor axis, the radial passage being substantially perpendicular to the rotor axis, and wherein the fluid flows in opposite directions through respective first and second arms of the axial cooling channel, the first arm having an end at the first end structure, the second arm having an end at the second end structure. The electric motor further comprises an annulus space formed by the radial passage, the annulus space positioned radially outward of the axial cooling channel. The rotor has multiple axial cooling channels extending through the rotor body, and wherein each of the multiple axial cooling channels has an elongate profile in cross section, the elongate profile extending in a radial direction from the rotor axis. The second end structure partially covers respective openings of each of the multiple axial cooling channels, and wherein non-covered portions of the respective openings form the outlet to the outside of the rotor. The electric motor further comprises tongues formed by the second end structure, each of the tongues oriented in a radial direction with regard to the rotor axis and extending between adjacent ones of the non-covered portions of the respective openings. A first tongue and a second tongue of the tongues define a group of the non-covered portions of the respective openings, and wherein the second end structure provides an offset so that the non-covered portions of the respective openings in the group have different heights in the radial direction with regard to the rotor axis. The offset comprises that the different heights of the non-covered portions of the respective openings in the group become greater in an opposite direction of a forward rotation direction of the electric motor. The rotor laminations consist of only a first type of lamination, a second type of lamination, and a third type of lamination. The second type of lamination is used at ends of the rotor body, as the first and second end structures, and in an axial center of the rotor body, wherein portions of the rotor body between the axial center and the ends are formed of instances of the first type of lamination, and wherein instances of the third type of lamination are used as transition laminations between the first and second types of lamination. The transition laminations form parallel paths for the fluid extending in a radial direction with regard to the rotor axis. The outlet of the second end structure is positioned radially inward of the axial cooling channel and radially outward of the outlet of the rotor shaft. The rotor laminations consist of only a first type of lamination, a second type of lamination, a third type of lamination, and a fourth type of lamination. The rotor has multiple axial cooling channels extending through the rotor body, and wherein the rotor body provides cross-flow relative to each other between adjacent ones of the multiple axial cooling channels. A beginning of each of the multiple axial cooling channels is at one of the first or second end structures, and wherein an end of each of the multiple axial cooling channels opposite the beginning is at another one of the first or second end structures. An order of the first, second, third and fourth types of lamination in the stack along the rotor axis is: at an end of the stack, a first instance of the first type of lamination, followed immediately by a first instance of the second type of lamination, followed immediately by a first instance of the third type of lamination, followed immediately by a second instance of the third type of lamination, wherein the first instance of the third type of lamination has a rotated position relative to the second instance of the third type of lamination, the second instance of the third type of lamination followed immediately by a first instance of the fourth type of lamination, followed immediately by a second instance of the first type of lamination, followed immediately by a second instance of the fourth type of lamination, wherein the first instance of the fourth type of lamination has a rotated position relative to the second instance of the fourth type of lamination, the second instance of the fourth type of lamination followed immediately by a third instance of the third type of lamination, wherein the third instance of the third type of lamination has a same rotated position as the rotated position of the first instance of the third type of lamination, the third instance of the third type of lamination followed immediately by a fourth instance of the third type of lamination, wherein the fourth instance of the third type of lamination has a same rotated position as the second instance of the third type of lamination, the fourth instance of the third type of lamination followed immediately by a second instance of the second type of lamination, followed immediately by a third instance of the first type of lamination. At least one of the first, second, third or fourth instances includes multiple laminations. The axial cooling channel is positioned at an outer diameter of the rotor shaft, wherein the first end structure has a first outlet to the outside of the rotor, wherein the outlet at the second end structure is a second outlet. The fluid includes oil. The electric motor is an induction motor. The electric motor further comprises differential gears positioned in the hollow interior, and wherein the fluid contacts the differential gear in the hollow interior. The axial cooling channel is substantially parallel with the rotor axis.

BRIEF DESCRIPTION OF DRAWINGS

Like reference symbols in the various drawings indicate like elements.

DETAILED DESCRIPTION

This document describes examples of systems and techniques for providing thermal control of an electric motor using one or more axial cooling channels through a rotor body. A liquid (including, but not limited to, oil) can be centrifugally driven, by rotation of the rotor, to flow through the axial cooling channel(s). The size, location and/or aspect ratio of an axial cooling channel can differ in various implementations, including, but not limited to, as shown in the examples of the present disclosure.

Examples described herein refer to an electric motor. As used herein, an electric motor can be any type of electric motor, including, but not limited to, an induction motor, a synchronous motor (e.g., a permanent-magnet motor or a wound field synchronous motor), or a reluctance motor.

Examples described herein refer to a top, bottom, front, or rear. These and similar expressions identify things or aspects in a relative way based on an express or arbitrary notion of perspective. That is, these terms are illustrative only, used for purposes of explanation, and do not necessarily indicate the only possible position, direction, and so on.

Figure 1A:
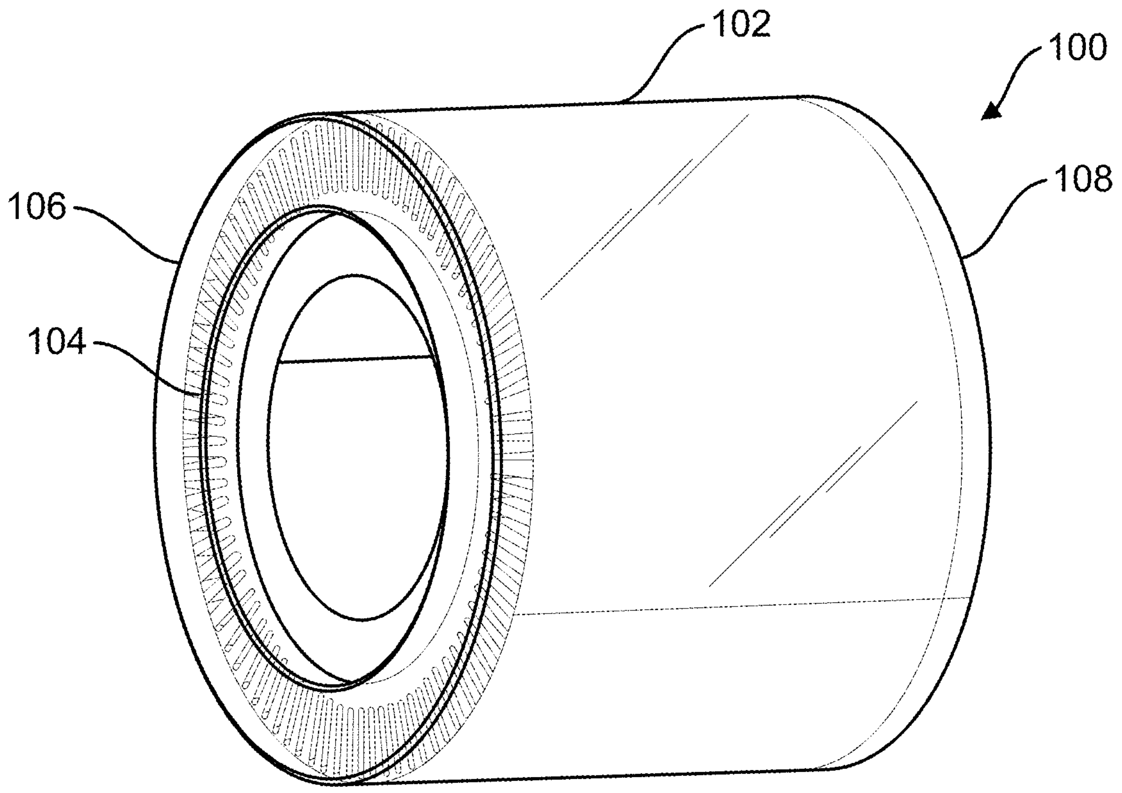
FIG. 1A schematically shows an example of a rotor for an electric motor, the rotor having axial cooling channels.

FIG. 1A schematically shows an example of a rotor 100 for an electric motor, the rotor 100 having axial cooling channels. The rotor 100 can be used with one or more other examples described elsewhere herein. The rotor 100 includes a rotor body 102 configured for rotation about a rotor axis using a rotor shaft (not shown for clarity). In some implementations, the rotor body 102 is formed of a stack of rotor laminations made of one or more materials. The stack can include one or more types of rotor laminations, for example as will be described later herein. The rotor 100 can be configured for use in an induction motor and can include bars 104 substantially parallel with each other. For example, the bars 104 can be at least substantially parallel with the rotor axis. As another example, in a skewed rotor design, the bars 104 can form a nonzero angle with the rotor axis. The bars 104 can be made of metal, including, but not limited to, aluminum (e.g., an alloy). The rotor 100 can include endrings 106, 108 at opposing axial ends of the rotor body 102. The endring 106 is here shown transparent for clarity. The endrings 106, 108 can be made of metal, including, but not limited to, aluminum (e.g., an alloy). The endrings 106, 108 and the bars 104 can together form a cage structure (e.g., a so-called squirrel cage). The rotor 100 has one or more axial cooling channels in the rotor body 102. The axial cooling channels can be used for circulating a fluid (e.g., oil) through the electric motor for thermal control.

Figure 1B:
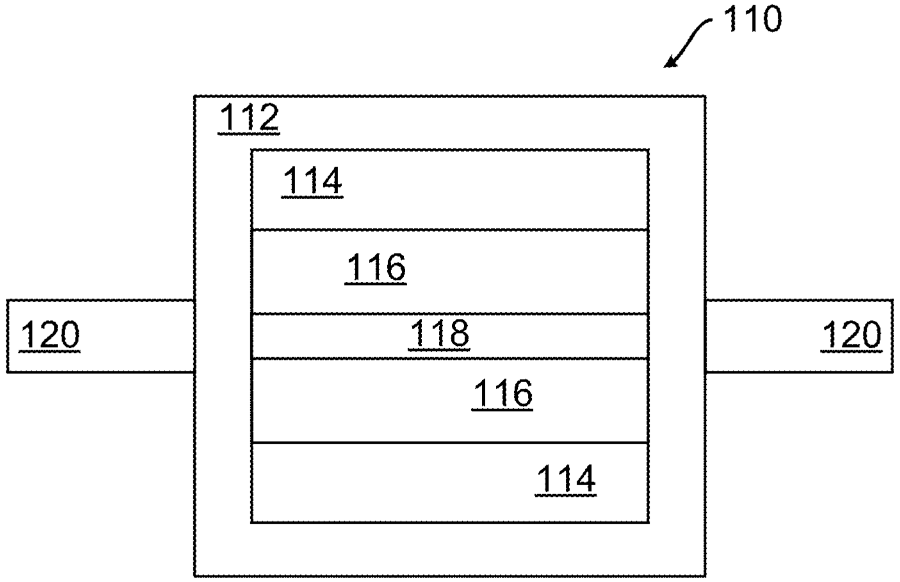
FIG. 1B schematically shows an example of an electric motor.

FIG. 1B schematically shows an example of an electric motor 110. The electric motor 110 can be used with one or more other examples described elsewhere herein. The electric motor 110 has a motor housing 112 with a stator 114. As used herein, a stator can be provided in form of a stator assembly, which includes a stator core (e.g., made of laminated electrical steel), stator windings, and winding to core insulations. The electric motor 110 has a rotor 116 within the motor housing 112. For example, the rotor 100 (FIG. 1A) can be the rotor 116. The rotor 116 is coupled to a rotor shaft 118 so as to be rotatable about a rotor axis. The electric motor 110 can rotate the rotor shaft 118 in one direction to drive the vehicle forward using a differential inside the rotor shaft 118. In other implementations, the differential may instead be positioned outside the rotor shaft 118. The electric motor 110 has one or more output shafts 120. For example, the output shaft 120 can be coupled to a wheel axle (e.g., welded to a drive shaft) or any other load to be driven by the electric motor 110. In some implementations, the electric motor 110 is an induction motor.

Figure 2:
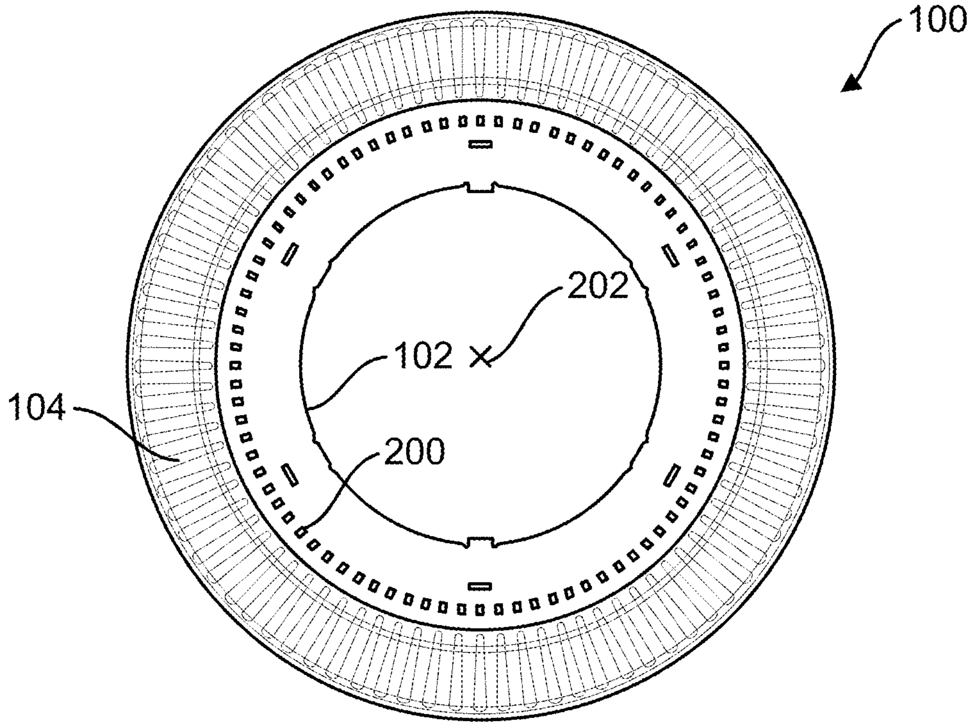
FIG. 2 shows an example of a cross section of the rotor of FIG. 1.

FIG. 2 shows an example of a cross section of the rotor 100 of FIG. 1. The rotor 100 includes axial cooling channels 200 extending through the rotor body 102. In some implementations, the axial cooling channels 200 are substantially parallel with a rotor axis 202. In other implementations, the axial cooling channels 200 can form a nonzero angle with the rotor axis 202. The rotor 100 can have multiple axial cooling channels extending through the rotor body 102, and the multiple axial cooling channels can be substantially parallel with each other. Each of the multiple axial cooling channels can have substantially the same radial distance from the rotor axis 202. The multiple axial cooling channels can have a common spacing between all adjacent ones of the multiple axial cooling channels.

Figure 3:
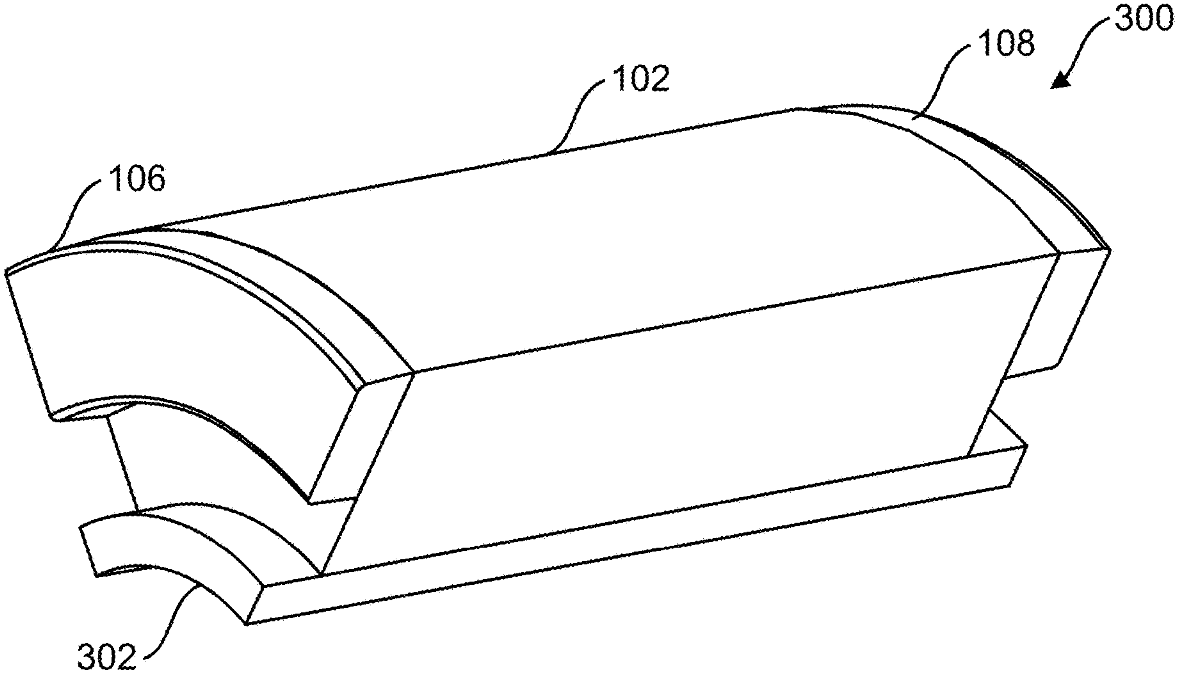
FIG. 3 shows a section through a portion of the rotor of FIG. 1.
Figure 4:
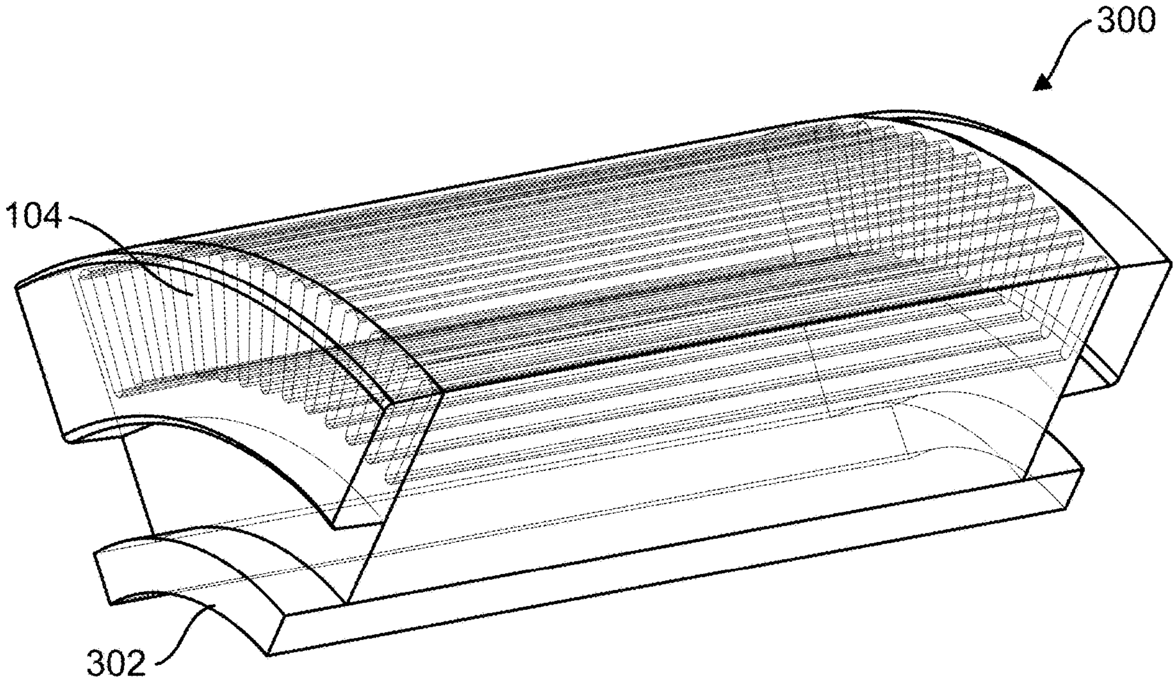
FIG. 4 shows a partially transparent version of the portion of the rotor of FIG. 1.

FIG. 3 shows a section through a portion 300 of the rotor 100 of FIG. 1. FIG. 4 shows a partially transparent version of the portion 300 of the rotor of FIG. 1. Here, the portion 300 shows the rotor body 102, the bars 104, the endrings 106, 108, and also a portion of a rotor shaft 302.

Figure 5:
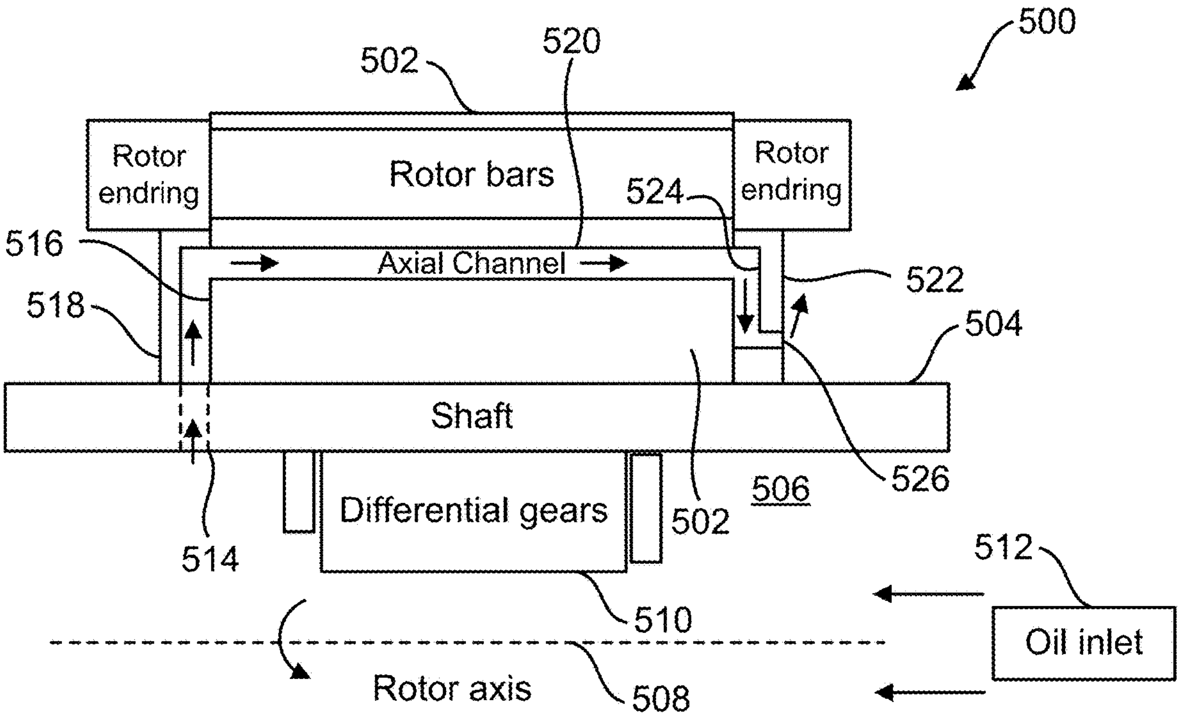
FIG. 5 schematically shows an example of an electric motor.

FIG. 5 schematically shows an example of an electric motor 500. The electric motor 500 can be used with one or more other examples described elsewhere herein. For purposes of illustration, only portions of the electric motor 500 are shown. For example, a stator and power electronics have been omitted for clarity. In the shown portions, the electric motor 500 includes a rotor body 502 (e.g., a stack of laminations) and a rotor shaft 504. The rotor shaft 504 has a hollow interior 506 and is configured for rotation inside a stator about a rotor axis 508. Differential gears 510 can be positioned in the hollow interior 506. For example, the differential gears 510 can form a so-called active core inside the rotor shaft 504. The rotor shaft 504 can have at least one inlet 512 into the hollow interior 506. For example, the inlet 512 includes one or more openings to a source of fluid so that the fluid can enter the hollow interior 506. The rotor shaft 504 can have at least one outlet 514 from the hollow interior 506. In some implementations, the outlet 514 is formed at the inner diameter of the rotor shaft 504. For example, the outlet 514 can include a passage extending in a radial direction (e.g., substantially perpendicular to the rotor axis 508) away from the rotor axis 508. The outlet 514 can facilitate that the fluid inside the hollow interior 506, after contacting the differential gears 510 (e.g., the fluid being oil that lubricates the differential gears 510), can be centrifugally driven into a passage 516. For example, the passage 516 extends substantially in the radial direction. In some implementations, the passage 516 is formed at least in part by end structure of the rotor body 502. For example, an end plate 518 can form the passage 516.

The rotor body 502 includes an axial cooling channel 520 that extends through the rotor body 502 and is coupled to the passage 516. The axial cooling channel 520 can be, but is not necessarily, substantially parallel with the rotor axis 508. From the passage 516, the fluid can be centrifugally flowed into the axial cooling channel 520. The axial cooling channel 520 can extend substantially from end to end of the rotor body 502. For example, the axial cooling channel 520 can extend to an end plate 522. In some implementations, a passage 524 is formed at least in part by end structure of the rotor body 502, such as by the end plate 522. That is, a beginning of the axial cooling channel 520 can be at the end plate 518 and an end of the axial cooling channel 520 opposite the beginning can be at the end plate 522. The end structure has an outlet 526. The outlet 526 can be positioned radially inward of the axial cooling channel 520. The outlet 526 can be positioned radially outward of the outlet 514 of the rotor shaft 504. Such a position of the outlet 526 radially inward of the axial cooling channel 520 and radially outward of the outlet 514 can facilitate that the axial cooling channel 520 is filled with the centrifugally pumped liquid; that is, the liquid may fully contact all inner surfaces of the axial cooling channel 520 and not merely coat the radially outermost inner surfaces of the axial cooling channel 520. Having the outlet 526 positioned radially outward of the outlet 514 can provide a net centrifugal force to drive the flow. Having the outlet 526 radially inward of the axial cooling channel 520 can facilitate that the axial cooling channel 520 is filled with liquid to provide a good coating of the inner surface of the axial cooling channel 520.

Figure 6:
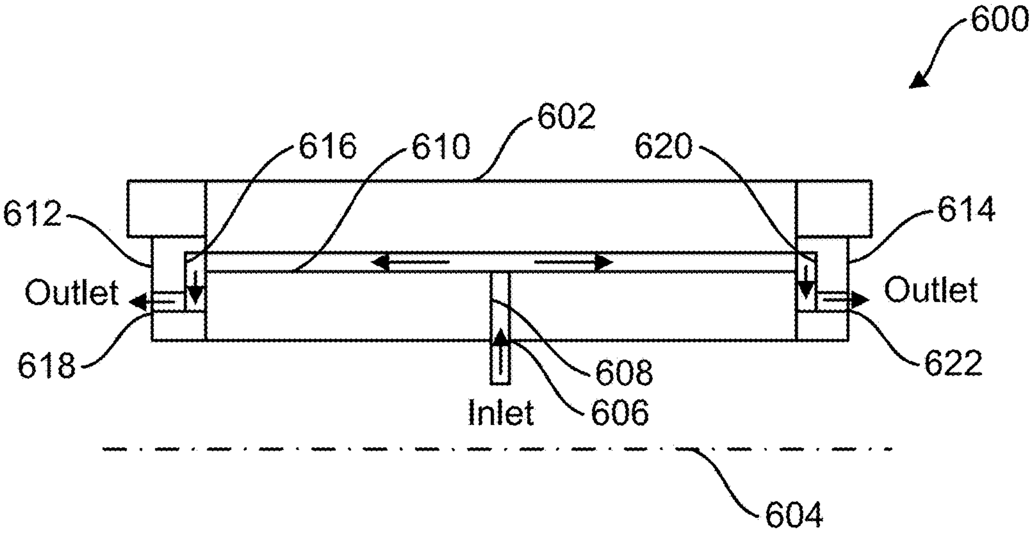
FIG. 6 schematically shows another example of an electric motor.

FIG. 6 schematically shows another example of an electric motor 600. The electric motor 600 can be used with one or more other examples described elsewhere herein. Only portions of the electric motor 600 are shown. For example, a rotor shaft, transmission, a stator, and power electronics have been omitted for clarity. In the shown portions, the electric motor 600 includes a rotor body 602 (e.g., a stack of laminations) and a rotor shaft (not shown). The rotor shaft has a hollow interior and is configured for rotation inside a stator about a rotor axis 604. Differential gears (not shown) can be positioned in the hollow interior of the rotor shaft. The rotor shaft can have at least one inlet into the hollow interior of the rotor shaft. The rotor shaft can have at least one outlet 606 from the hollow interior. In some implementations, the outlet 606 is formed at the inner diameter of the rotor shaft. For example, the outlet 606 can include a passage extending in a radial direction (e.g., substantially perpendicular to the rotor axis 604) away from the rotor axis 604. The outlet 606 can facilitate that the fluid inside the hollow interior, after contacting the differential gears, can be centrifugally driven into a radial passage 608. In some implementations, the radial passage 608 is formed at least in part by the rotor body 602 (e.g., by laminations thereof).

The rotor body 602 includes an axial cooling channel 610 that extends through the rotor body 602 and is coupled to the radial passage 608. The radial passage 608 can be positioned at a center of the axial cooling channel 610 along the rotor axis 604. The axial cooling channel 610 can be, but is not necessarily, substantially parallel with the rotor axis 604. From the radial passage 608, the fluid can enter (be centrifugally flowed into) the axial cooling channel 610. The axial cooling channel 610 can extend substantially from the axial center and in opposite directions (e.g., through respective arms) toward each end of the rotor body 602. An end structure such as an end plate 612 can be positioned at one end of the rotor body 602, and an end structure such as an end plate 614 can be positioned at an opposite end of the rotor body 602. In some implementations, a passage 616 is formed at least in part by end structure of the rotor body 602, such as by the end plate 612. The end structure has an outlet

618. In some implementations, a passage 620 is formed at least in part by end structure of the rotor body 602, such as by the end plate 614. The end structure has an outlet 622. The outlet 618 and/or 622 can be positioned radially inward of the axial cooling channel 610. The outlet 618 and/or 622 can be positioned radially outward of the outlet 606 of the rotor shaft. For example, such position(s) can facilitate good coating of the inner surface of the axial cooling channel 610. Having the outlet 618 and/or 622 positioned radially outward of the outlet 606 can provide a net centrifugal force to drive the flow. Having the outlet 618 and/or 622 radially inward of the axial cooling channel 610 can facilitate that the axial cooling channel 610 is filled with liquid to provide a good coating of the inner surface of the axial cooling channel 610.

Figure 7:
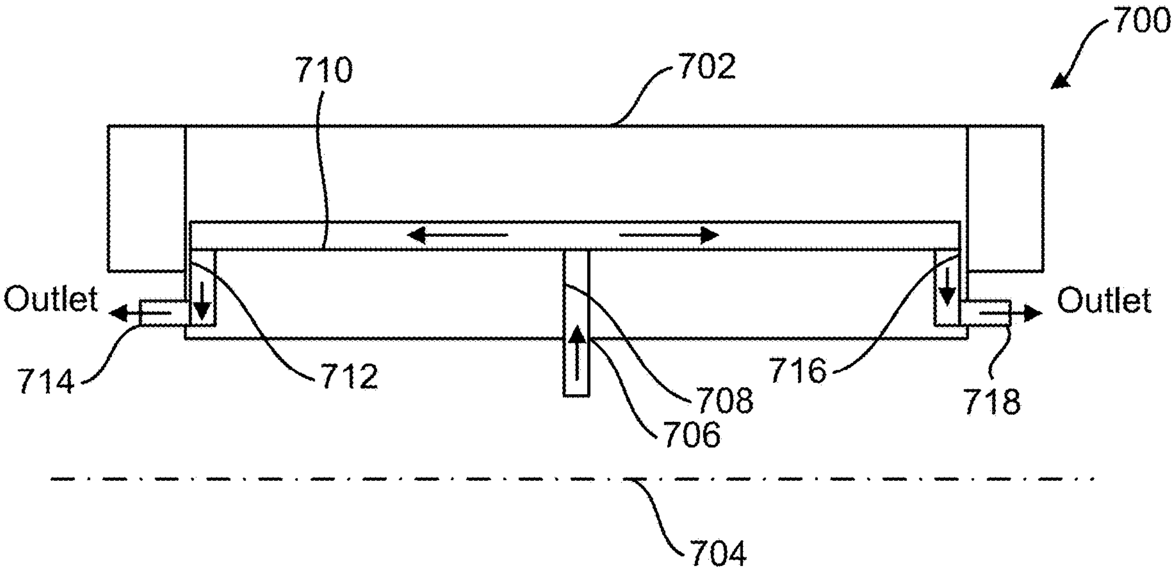
FIG. 7 schematically shows another example of an electric motor.

FIG. 7 schematically shows another example of an electric motor 700. The electric motor 700 can be used with one or more other examples described elsewhere herein. Only portions of the electric motor 700 are shown. For example, a rotor shaft, transmission, a stator, power electronics and one or more gears have been omitted for clarity. In the shown portions, the electric motor 700 includes a rotor body 702 (e.g., a stack of laminations) and a rotor shaft (not shown). The rotor shaft has a hollow interior and is configured for rotation inside a stator about a rotor axis 704. Differential gears can be positioned in the hollow interior of the rotor shaft. The rotor shaft can have at least one inlet into the hollow interior of the rotor shaft. The rotor shaft can have at least one outlet 706 from the hollow interior. In some implementations, the outlet 706 is formed at the inner diameter of the rotor shaft. For example, the outlet 706 can include a passage extending in a radial direction (e.g., substantially perpendicular to the rotor axis 704) away from the rotor axis 704. The outlet 706 can facilitate that the fluid inside the hollow interior, after contacting the differential gears, can be centrifugally driven into a radial passage 708. In some implementations, the radial passage 708 is formed at least in part by the rotor body 702 (e.g., by laminations thereof).

The rotor body 702 includes an axial cooling channel 710 that extends through the rotor body 702 and is coupled to the radial passage 708. The radial passage 708 can be positioned at a center of the axial cooling channel 710 along the rotor axis 704. The axial cooling channel 710 can be, but is not necessarily, substantially parallel with the rotor axis 704. From the radial passage 708, the fluid can be centrifugally flowed into the axial cooling channel 710. The axial cooling channel 710 can extend substantially from the axial center and in opposite directions toward each end of the rotor body 702. In some implementations, a passage 712 is formed by end structure of the rotor body 702, such as by laminations thereof. The end structure has an outlet 714. In some implementations, a passage 716 is formed by end structure of the rotor body 702, such as by laminations thereof. The end structure has an outlet 718. The outlet 714 and/or 718 can be positioned radially inward of the axial cooling channel 710. The outlet 714 and/or 718 can be positioned radially outward of the outlet 706 of the rotor shaft. Having the outlet 714 and/or 718 positioned radially outward of the outlet 706 can provide a net centrifugal force to drive the flow. For example, such position(s) can facilitate good coating of the inner surface of the axial cooling channel 710. Having the outlet 714 and/or 718 radially inward of the axial cooling channel 710 can facilitate that the axial cooling channel 710 is filled with liquid to provide a good coating of the inner surface of the axial cooling channel 710.

Figure 8:
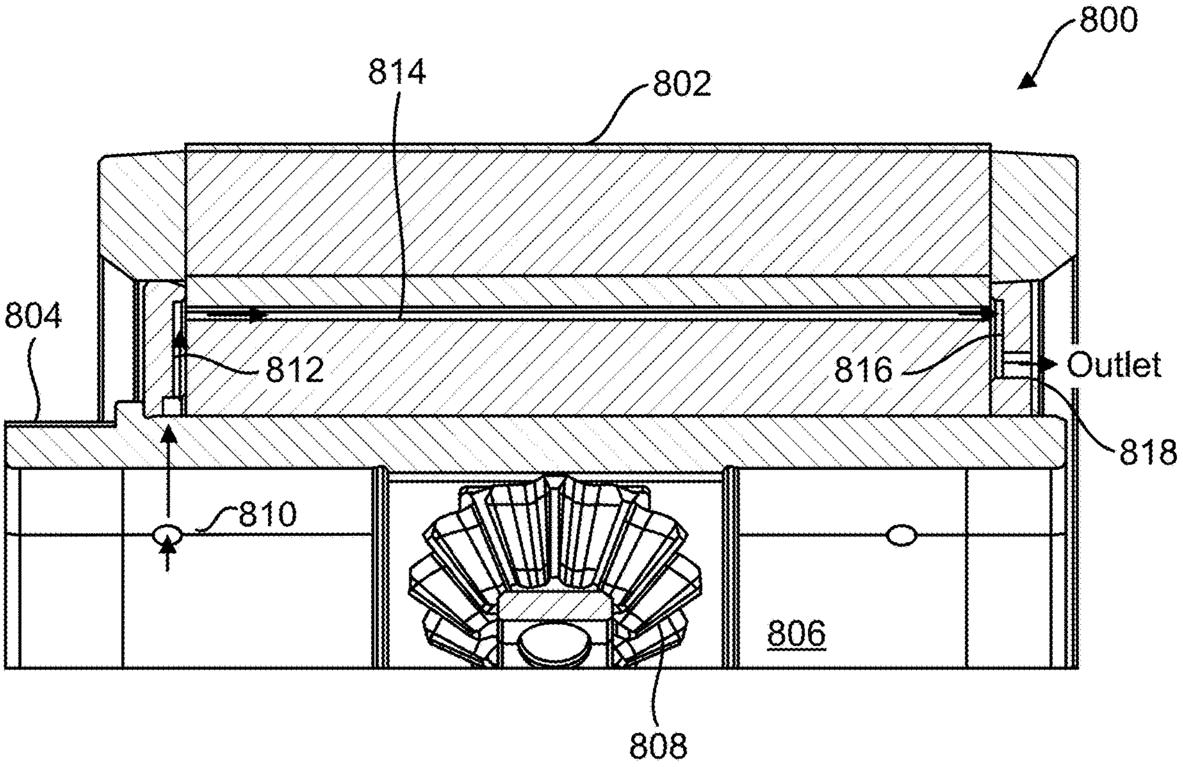
FIG. 8 shows a section through an electric motor.
Figure 9:
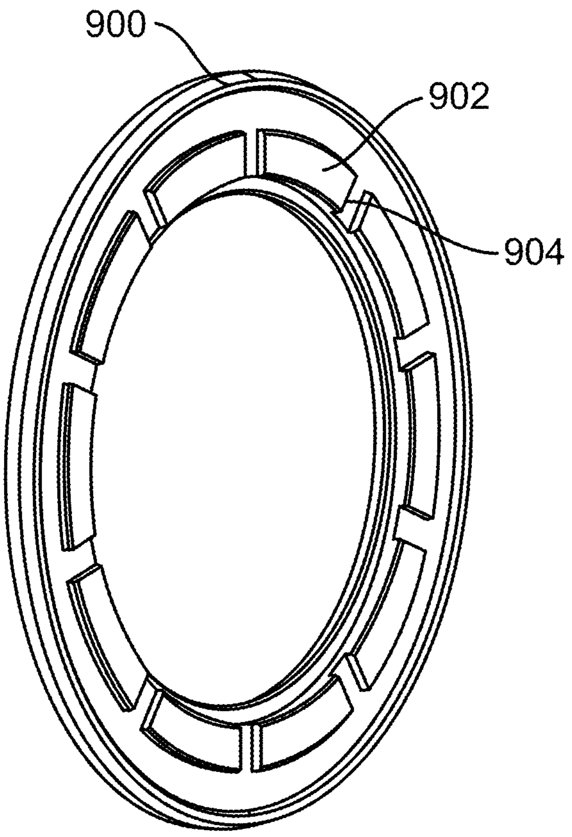
FIG. 9 shows an example of an end plate that can be used with an electric motor described elsewhere herein.
Figure 10:
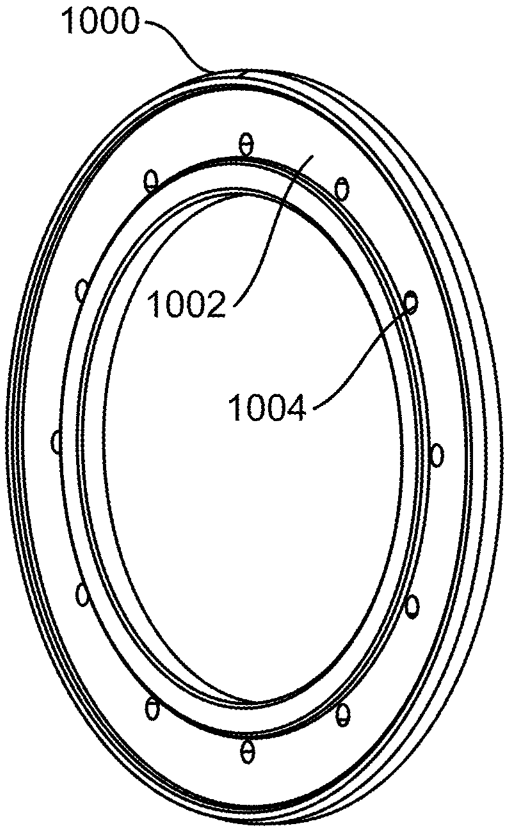
FIG. 10 shows an example of an end plate that can be used with an electric motor described elsewhere herein.

FIG. 8 shows a section through an electric motor 800. FIG. 9 shows an example of an end plate 900 that can be used with an electric motor described elsewhere herein. FIG. 10 shows an example of an end plate 1000 that can be used with an electric motor described elsewhere herein. The electric motor 800 can be used with one or more other examples described elsewhere herein. Only portions of the electric motor 800 are shown. For example, a stator and power electronics have been omitted for clarity. In the shown portions, the electric motor 800 includes a rotor body 802 (e.g., a stack of laminations) and a rotor shaft 804. The rotor shaft 804 has a hollow interior 806 and is configured for rotation inside a stator about a rotor axis. Differential gears 808 can be positioned in the hollow interior 806. For example, the differential gears 808 can form a so-called active core inside the rotor shaft 804. The rotor shaft 804 can have at least one inlet into the hollow interior 806. For example, the inlet includes one or more openings to a source of fluid. The rotor shaft 804 can have at least one outlet 810 from the hollow interior 806. In some implementations, the outlet 810 is formed at the inner diameter of the rotor shaft 804. For example, the outlet 810 can include a passage extending in a radial direction (e.g., substantially perpendicular to the rotor axis) away from the rotor axis. The outlet 810 can facilitate that the fluid inside the hollow interior 806, after contacting the differential gears 808 (e.g., the fluid being oil that lubricates the differential gears 808), can be centrifugally driven into a passage 812. For example, the passage 812 extends substantially in the radial direction. The passage 812 can be formed at least in part by end structure of the rotor body 802. In some implementations, the end plate 900 and the rotor body 802 can form the passage 812. For example, the end plate 900 can include two or more bridges 902 positioned so that a gap 904 is formed between adjacent ones of the bridges 902. The passage 812 can be formed at least in part by the gap 904.

The rotor body 802 includes an axial cooling channel 814 that extends through the rotor body 802 and is coupled to the passage 812. The axial cooling channel 814 can be, but is not necessarily, substantially parallel with the rotor axis. From the passage 812, the fluid can be centrifugally flowed into the axial cooling channel 814. The axial cooling channel 814 can extend substantially from end to end of the rotor body 802. For example, the axial cooling channel 814 can extend to an opposite end of the rotor body 802. In some implementations, a passage 816 is formed at least in part by end structure of the rotor body 802. In some implementations, the end plate 1000 and the rotor body 802 can form the passage 816. For example, the end plate 1000 can include a recessed area 1002 positioned at the end of the axial cooling channel 814. The passage 816 can be formed at least in part by the recessed area 1002.

The end structure has an outlet 818. The outlet 818 can be formed by the end structure. In some implementations, the end plate 1000 includes one or more openings 1004 that can form the outlet 818. The outlet 818 can be positioned radially inward of the axial cooling channel 814. The outlet 818 can be positioned radially outward of the outlet 810 of the rotor shaft. Such a position of the outlet 818 radially inward of the axial cooling channel 814 and radially outward of the outlet 810 can facilitate that the axial cooling channel 814 is filled with the centrifugally pumped liquid; that is, the liquid may fully contact all inner surfaces of the axial cooling channel 814 and not merely coat the radially outermost inner surfaces of the axial cooling channel 814. Having the outlet 818 positioned radially outward of the outlet 810 can provide a net centrifugal force to drive the flow. Having the outlet 818 radially inward of the axial cooling channel 814 can facilitate that the axial cooling channel 814 is filled with liquid to provide a good coating of the inner surface of the axial cooling channel 814.

Figure 11:
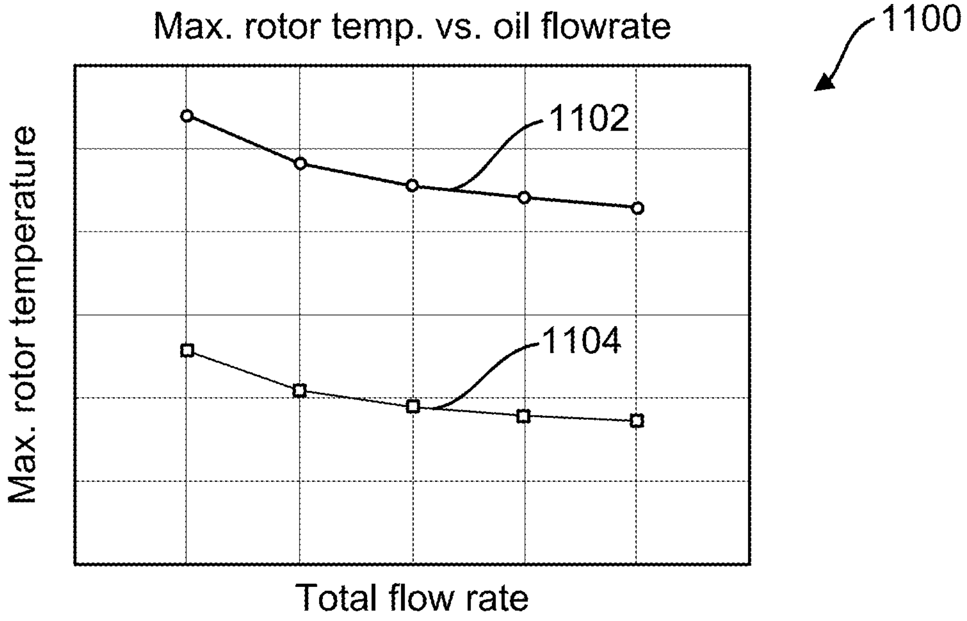
FIG. 11 shows an example of a diagram of temperature as a function of fluid flow rate.

FIG. 11 shows an example of a diagram 1100 of temperature as a function of fluid flow rate. The diagram 1100 shows a graph 1102 corresponding to temperatures when the electric motor has cooling only inside the hollow interior of the rotor shaft, but does not have any axial cooling channels inside the rotor body. The diagram 1100 also shows a graph 1104 corresponding to temperatures when the electric motor has cooling both inside the hollow interior of the rotor shaft and in axial cooling channels inside the rotor body. Generally, each of the graphs 1102-1104 shows that the rotor temperature can be decreased by increasing the flow rate (that is, by flowing a greater volume of fluid being through the rotor per unit of time). However, the graph 1104 also shows that by adding axial cooling channels in the rotor body, the rotor temperature can consistently be kept significantly lower than in the graph 1102.

Figure 12:
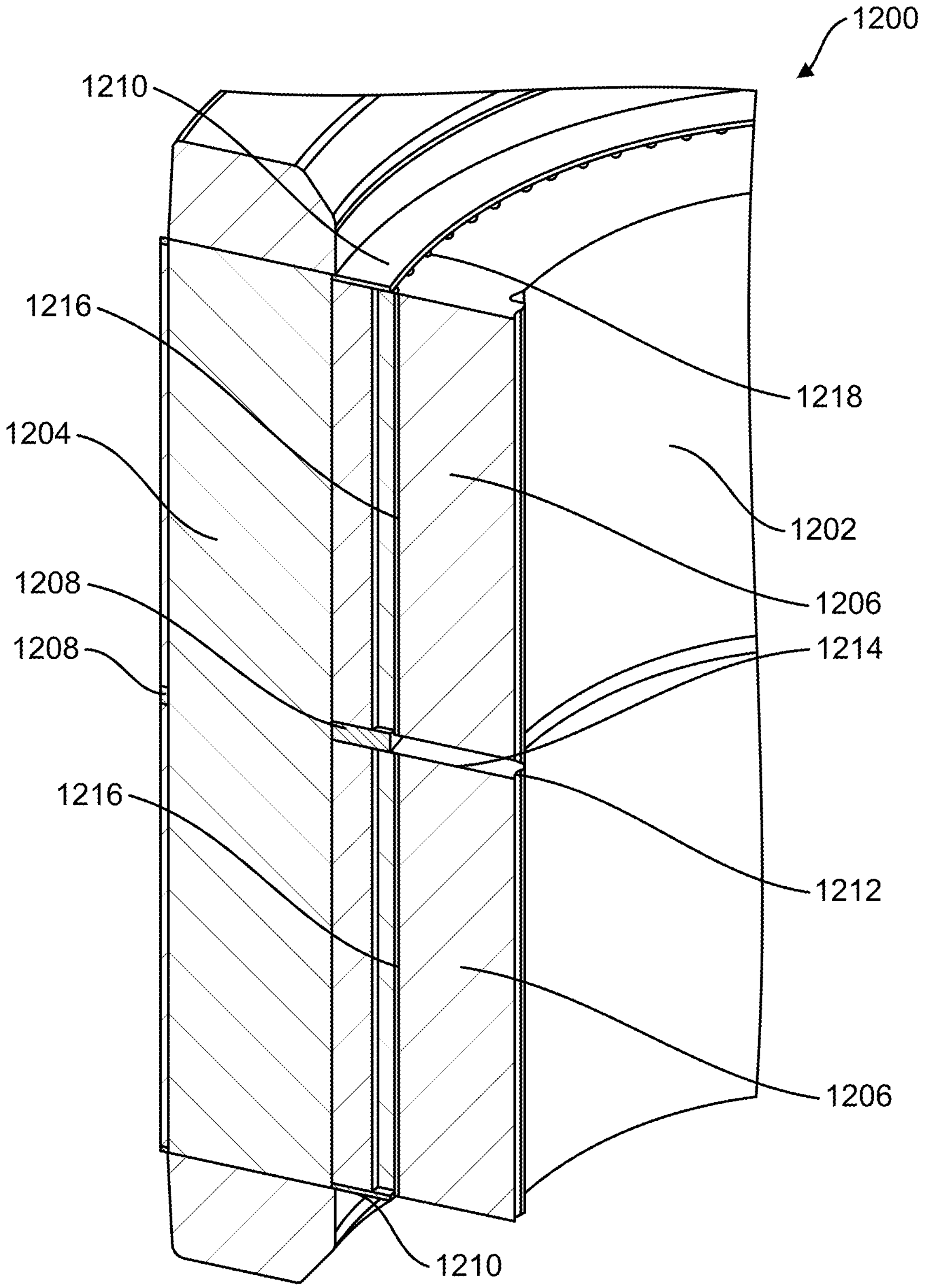
FIG. 12 shows an example of a lamination stack that can be used with an electric motor described elsewhere herein, the lamination stack using two types of lamination.

FIG. 12 shows an example of a lamination stack 1200 that can be used with an electric motor described elsewhere herein, the lamination stack 1200 using two types of lamination. The lamination stack 1200 can be used with one or more other examples described elsewhere herein. The lamination stack 1200 is being shown in cross section, and only a portion of the lamination stack 1200 is shown for clarity. A surface 1202 defines an inner diameter of a rotor shaft, and a bar 1204 can be part of a squirrel cage when the rotor is used in an induction motor.

The lamination stack 1200 is formed from a stack of individual rotor laminations. In some implementations, the lamination stack 1200 involves only two types of rotor laminations. A main portion 1206 of the rotor body can be formed from a first type of lamination; by contrast, a center portion 1208 of the rotor body, and end structures 1210 can be formed from a second type of lamination different from the first type of lamination. One or more of the main portion 1206, the center portion 1208, or the end structures 1210 can be formed by substacks of multiple instances of the respective type of lamination. For simplicity, each of the main portion 1206, the center portion 1208, and the end structures 1210 is here shown as an integral component without indicating the possible presence of multiple laminations therein. The second type of lamination is used only at ends of the rotor body (as the end structure 1210) and in an axial center of the rotor body (as the center portion 1208). A remainder of the rotor body (the main portion 1206) is formed of instances of the first type of lamination.

The rotor shaft can have at least one outlet 1212 from the hollow interior. In some implementations, the outlet 1212 is formed at the inner diameter of the rotor shaft. For example, the outlet 1212 can include a passage extending in a radial direction (e.g., substantially perpendicular to the rotor axis) away from the rotor axis. The outlet 1212 can facilitate that the fluid inside the hollow interior, after contacting the differential gears, can be centrifugally driven into a radial passage 1214. In some implementations, the radial passage 1214 is formed at least in part by the rotor body (e.g., by laminations thereof). For example, the second type of lamination can include an opening that is not present in the corresponding area of the first type of lamination, thus defining the radial passage 1214.

The rotor body includes an axial cooling channel 1216 that extends through the rotor body and is coupled to the radial passage 1214. The radial passage 1214 can be positioned at a center of the axial cooling channel 1216 along the rotor axis. The axial cooling channel 1216 can be, but is not necessarily, substantially parallel with the rotor axis. From the radial passage 1214, the fluid can be centrifugally flowed into the axial cooling channel 1216. The axial cooling channel 1216 can extend substantially from the axial center and in opposite directions toward each end of the rotor body. In some implementations, each of the axial cooling channels 1216 forms an opening 1218 in end structure of the rotor body (e.g., in the first type of lamination forming the main portion 1206). The end structure 1210 formed by the second type of lamination partially covers the opening 1218 to form an outlet at the end structure 1210. The outlet can be positioned radially inward of the axial cooling channel 1216. The outlet can be positioned radially outward of the outlet 1212 of the rotor shaft. For example, such position(s) can facilitate good coating of the inner surface of the axial cooling channel 1216. Having the outlet positioned radially outward of the outlet 1212 can provide a net centrifugal force to drive the flow. The outlet can block a majority of the channels at the ends and enforce having the channel section at the outer diameter of the outlet filled with liquid/oil. The bottom (i.e., inner diameter) of the axial cooling channels aligned with the outlets may not be filled. In other words, by having the end structure 1210 blocking a large portion of the channels, one can fill that blocked portion axially along the channels, filled with liquid/oil, and the section that is exposed at the outlet might not have oil fill inside the channels. In this design, since the opening 1218 are not exactly at the inner diameter of the axial channels all together, one may not have 100% of the channels filled with liquid/oil; but still, the majority of the channels can be filled with liquid/oil.

Figure 13:
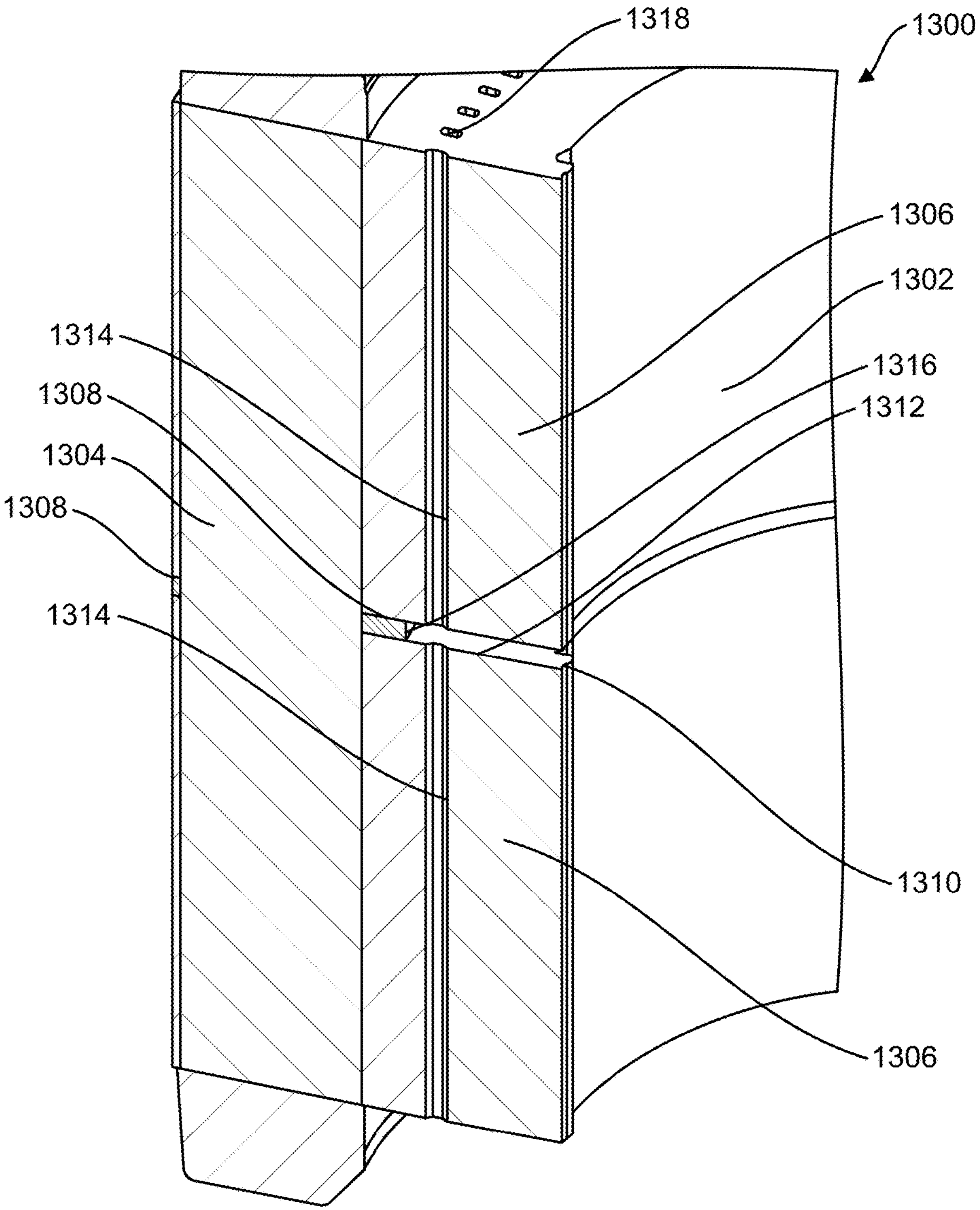
FIG. 13 shows another example of a lamination stack that can be used with an electric motor described elsewhere herein, the lamination stack using two types of lamination.

FIG. 13 shows another example of a lamination stack 1300 that can be used with an electric motor described elsewhere herein, the lamination stack 1300 using two types of lamination. The lamination stack 1300 can be used with one or more other examples described elsewhere herein. The lamination stack 1300 is being shown in cross section, and only a portion of the lamination stack 1300 is shown for clarity. A surface 1302 defines an inner diameter of a rotor shaft, and a bar 1304 can be part of a squirrel cage when the rotor is used in an induction motor.

The lamination stack 1300 is formed from a stack of individual rotor laminations. In some implementations, the lamination stack 1300 involves only two types of rotor laminations. A main portion 1306 of the rotor body can be formed from a first type of lamination; by contrast, a center portion 1308 of the rotor body can be formed from a second type of lamination different from the first type of lamination. One or more of the main portion 1306 or the center portion 1308 can be formed by substacks of multiple instances of the respective type of lamination. For simplicity, each of the main portion 1306 and the center portion 1308 is here shown as an integral component without indicating the possible presence of multiple laminations therein. The second type of lamination is used only in an axial center of the rotor body (as the center portion 1308). A remainder of the rotor body (the main portion 1306) is formed of instances of the first type of lamination.

The rotor shaft can have at least one outlet 1310 from the hollow interior. In some implementations, the outlet 1310 is formed at the inner diameter of the rotor shaft. For example, the outlet 1310 can include a passage extending in a radial direction (e.g., substantially perpendicular to the rotor axis) away from the rotor axis. The outlet 1310 can facilitate that the fluid inside the hollow interior, after contacting the differential gears, can be centrifugally driven into a radial passage 1312. In some implementations, the radial passage 1312 is formed at least in part by the rotor body (e.g., by laminations thereof). For example, the second type of lamination can include an opening that is not present in the corresponding area of the first type of lamination, thus defining the radial passage 1312.

The rotor body includes an axial cooling channel 1314 that extends through the rotor body and is coupled to the radial passage 1312. The radial passage 1312 can be positioned at a center of the axial cooling channel 1314 along the rotor axis. The axial cooling channel 1314 can be, but is not necessarily, substantially parallel with the rotor axis. From the radial passage 1312, the fluid can be centrifugally flowed into the axial cooling channel 1314. The axial cooling channel 1314 can extend substantially from the axial center and in opposite directions toward each end of the rotor body. The radial passage 1312 can define an annulus space 1316 formed by the radial passage 1312. The annulus space 1316 can be positioned radially outward of the axial cooling channel 1314.

In some implementations, each of the axial cooling channels 1314 forms an opening 1318 in end structure of the rotor body (e.g., in the first type of lamination forming the main portion 1306). The opening 1318 can form an outlet at the end structure. The outlet can be positioned radially outward of the outlet 1310 of the rotor shaft. For example, the presence of the annulus space 1316 can facilitate more uniform coating of the inner surface of the axial cooling channel 1314. Having the outlet positioned radially outward of the outlet 1310 can provide a net centrifugal force to drive the flow. Since the openings 1318 are in the same radial coordinate of the axial cooling channels 1314, the axial cooling channels 1314 may not become filled with liquid (e.g., oil) at all their inner surfaces. For example, only the outer diameter part of the channels may become occupied by oil flow.

Figure 14:
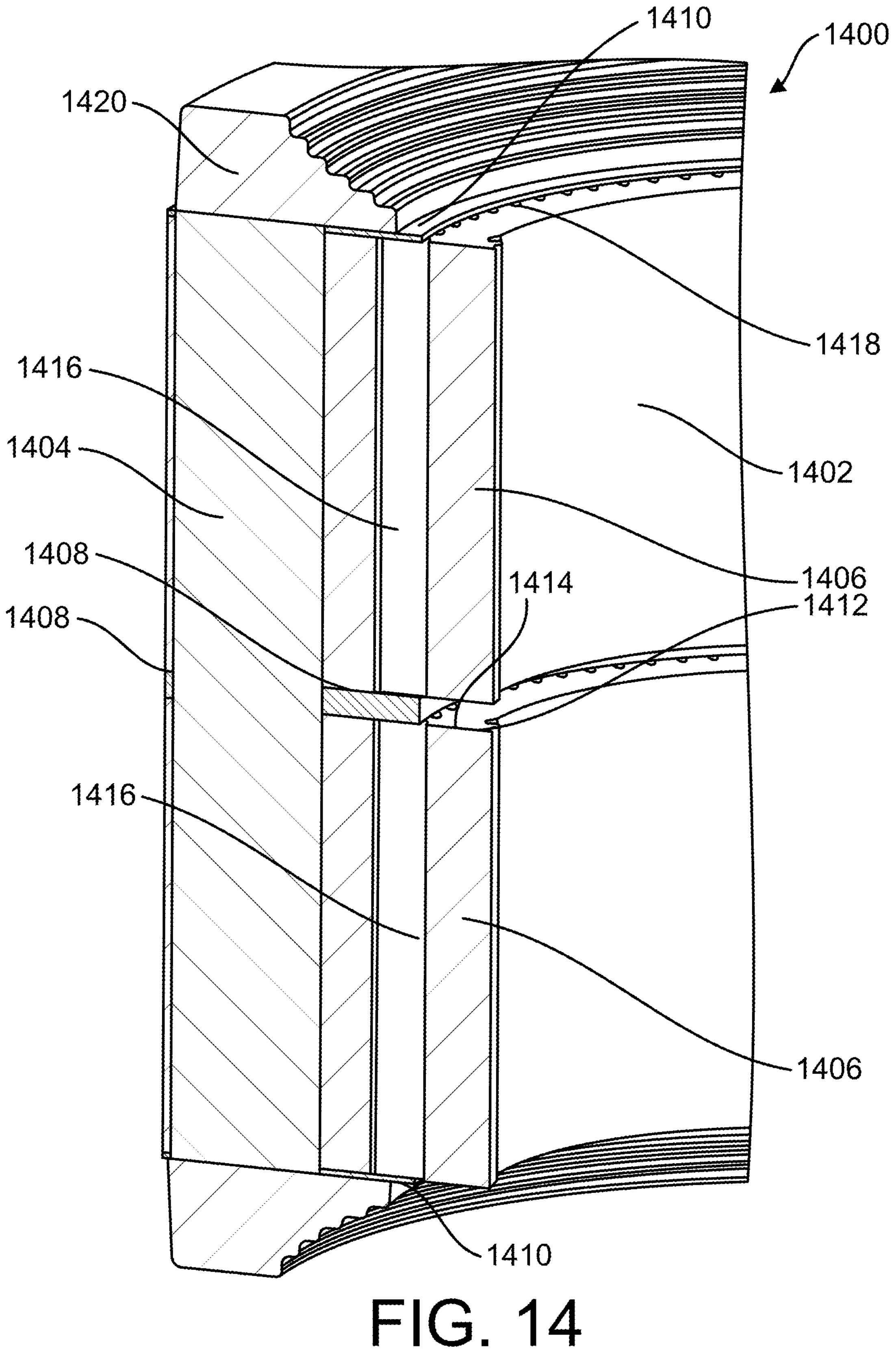
FIG. 14 shows another example of a lamination stack that can be used with an electric motor described elsewhere herein, the lamination stack using two types of lamination.

FIG. 14 shows another example of a lamination stack 1400 that can be used with an electric motor described elsewhere herein, the lamination stack 1400 using two types of lamination. The lamination stack 1400 can be used with one or more other examples described elsewhere herein. The lamination stack 1400 is being shown in cross section, and only a portion of the lamination stack 1400 is shown for clarity. A surface 1402 defines an inner diameter of a rotor shaft, and a bar 1404 can be part of a squirrel cage when the rotor is used in an induction motor.

The lamination stack 1400 is formed from a stack of individual rotor laminations. In some implementations, the lamination stack 1400 involves only two types of rotor laminations. A main portion 1406 of the rotor body can be formed from a first type of lamination; by contrast, a center portion 1408 of the rotor body, and end structures 1410 can be formed from a second type of lamination different from the first type of lamination. One or more of the main portion 1406, the center portion 1408, or the end structures 1410 can be formed by substacks of multiple instances of the respective type of lamination. For simplicity, each of the main portion 1406, the center portion 1408, and the end structures 1410 is here shown as an integral component without indicating the possible presence of multiple laminations therein. The second type of lamination is used only at ends of the rotor body (as the end structure 1410) and in an axial center of the rotor body (as the center portion 1408). A remainder of the rotor body (the main portion 1406) is formed of instances of the first type of lamination.

The rotor shaft can have at least one outlet 1412 from the hollow interior. In some implementations, the outlet 1412 is formed at the inner diameter of the rotor shaft. For example, the outlet 1412 can include a passage extending in a radial direction (e.g., substantially perpendicular to the rotor axis) away from the rotor axis. The outlet 1412 can facilitate that the fluid inside the hollow interior, after contacting the differential gears, can be centrifugally driven into a radial passage 1414. In some implementations, the radial passage 1414 is formed at least in part by the rotor body (e.g., by laminations thereof). For example, the second type of lamination can include an opening that is not present in the corresponding area of the first type of lamination, thus defining the radial passage 1414.

The rotor body includes an axial cooling channel 1416 that extends through the rotor body and is coupled to the radial passage 1414. Compared to the lamination stack 1200 of FIG. 12, the lamination stack 1400 can be characterized as having a different size of the axial cooling channel 1416, with the axial cooling channel 1216 (FIG. 12) being smaller. In the lamination stack 1200 (FIG. 12) the relatively large section at the radial passage 1214 can present a structural challenge. In the lamination stack 1400, on the other hand, the axial cooling channel 1416 is enlarged, leading to the axial cooling channel 1416 being smaller than in the lamination stack 1200 (FIG. 12). Such an approach can be preferred from a structural perspective but can negatively affect motor performance because more of the laminations of the rotor stack are extracted to form the axial cooling channel 1416. The radial passage 1414 can be positioned at a center of the axial cooling channel 1416 along the rotor axis. The axial cooling channel 1416 can be, but is not necessarily, substantially parallel with the rotor axis. From the radial passage 1414, the fluid can be centrifugally flowed into the axial cooling channel 1416. The axial cooling channel 1416 can extend substantially from the axial center and in opposite directions toward each end of the rotor body. Each of the axial cooling channels 1416 has an elongate profile in cross section, the elongate profile extending in a radial direction from the rotor axis. In some implementations, each of the axial cooling channels 1416 forms an opening 1418 in end structure of the rotor body (e.g., in the first type of lamination forming the main portion 1406). The end structure 1410 formed by the second type of lamination partially covers the opening 1418 to form an outlet at the end structure 1410. For example, only the radially most inward portion of the opening 1418 is not covered by the end structure 1410. The outlet can be positioned radially inward of the axial cooling channel 1416. The outlet can be positioned radially outward of the outlet 1412 of the rotor shaft. For example, such position(s) can facilitate good coating of the inner surface of the axial cooling channel 1416. Having the outlet positioned radially outward of the outlet 1412 can provide a net centrifugal force to drive the flow. Having the outlet radially inward of the axial cooling channel 1416 can facilitate that the axial cooling channel 1416 is filled with liquid to provide a good coating of the inner surface of the axial cooling channel 1416. Since the openings 1418 are in the same radial coordinate of the axial cooling channels 1414, the axial cooling channels 1414 may not become filled with liquid (e.g., oil) at all their inner surfaces. For example, only the outer diameter part of the channels may become occupied by oil flow. The rotor can have an endring 1420.

Figure 15:
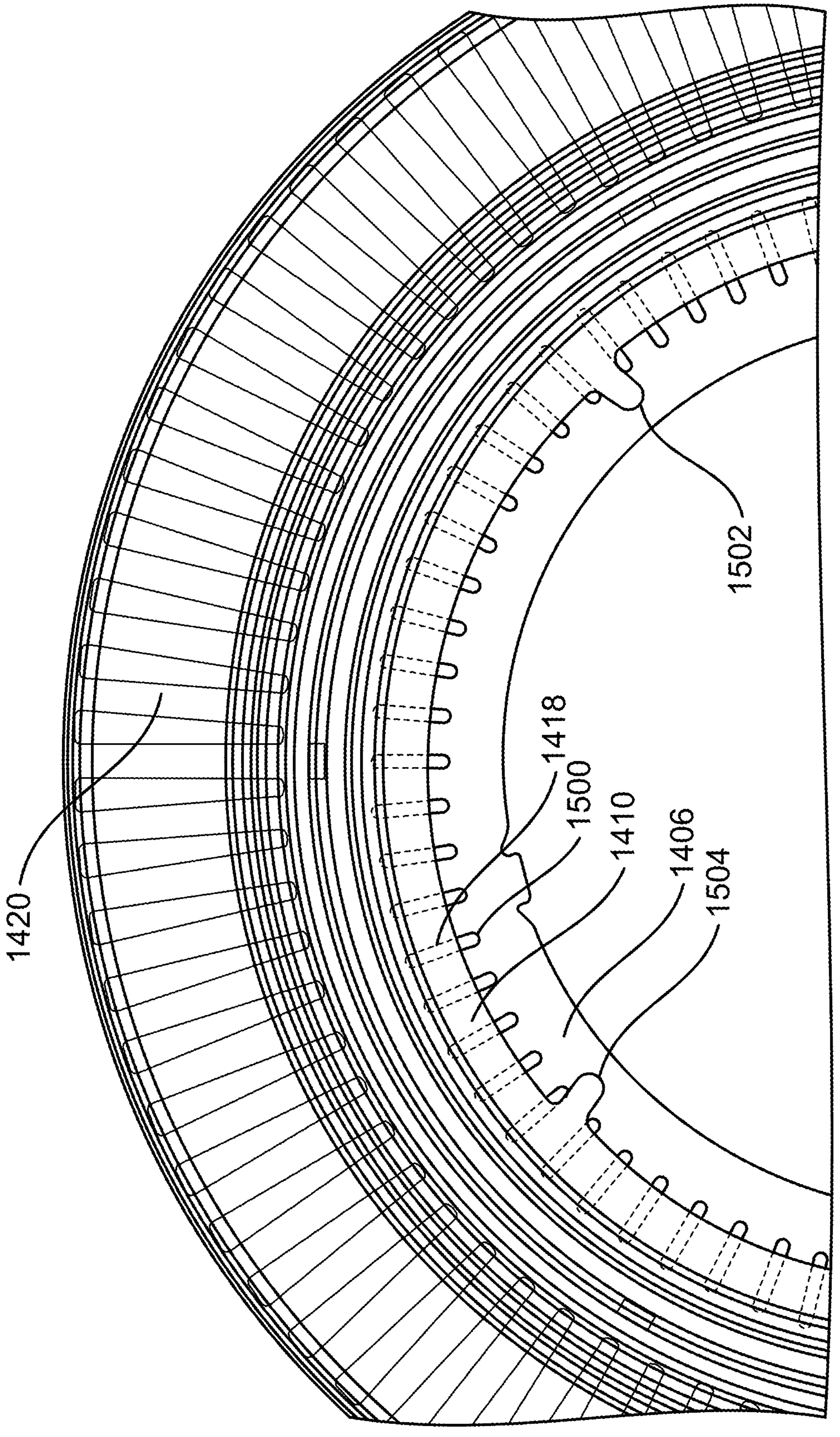
FIG. 15 shows an example section through the lamination stack of FIG. 14.

FIG. 15 shows an example section through the lamination stack 1400 of FIG. 14. The end structure 1410 can partially cover the opening 1418 of each of the multiple axial cooling channels formed in the main portion 1406 (e.g., in the laminations of the first type). The covered portions are here shown in phantom. Non-covered portions 1500 of the respective openings are shown in solid lines and can form the outlet to the outside of the rotor from the axial cooling channel 1416 (FIG. 14). The end structure 1410 can form tongues 1502, 1504. Each of the tongues 1502, 1504 can be oriented in a radial direction with regard to the rotor axis. Each of the tongues 1502, 1504 can be positioned between a pair of adjacent ones of the non-covered portions 1500 of the openings 1418. The tongues 1502, 1504 can define a group of the non-covered portions 1500 of the openings 1418. The end structure 1410 can provide an offset between the tongues 1502, 1504. In some implementations, the offset comprises that the end structure 1410 covers more of one of the openings 1418 in one area of the group than it covers another one of the openings 1418 in another area of the group. The non-covered portions 1500 of the openings 1418 in the group can have different respective heights, in the radial direction with regard to the rotor axis, than each other. The offset can comprise that the different heights of the non-covered portions 1500 of the openings 1418 in the group become greater in an opposite direction of a forward rotation direction of the electric motor. For example, when the electric motor having the lamination stack 1400 of FIG. 14 as shown here rotates clockwise when driving the vehicle forward, this rotation can subject the fluid to a force in the counterclockwise direction. Accordingly, the different heights of the non-covered portions 1500 of the openings 1418 in the group become greater in the counterclockwise direction. When more than two of the tongues 1502, 1504 are used, each group of the non-covered portions 1500 can be subjected to a similar offset as every other group. Another reason for this offset, in addition to the force mentioned above, is the effect of the distance of the inlets at the rotor shaft to each of the outlets. One or more drills in the shaft can connect the inner diameter of the shaft to the outer diameter of the shaft (or to the inner diameter of the rotor body). This can provide more fluid close to the inlet of the shaft, and as the fluid moves angularly away from those drills in the shaft, less flow occurs in the channels. That is, to improve flow uniformity in the channels, one can enlarge the outlets farther from the inlets to facilitate flow through those channels. As a result, the outlet sizes are non-uniform, with larger outlets angularly farther away from the inlets in the shaft and smaller outlets angularly closer to the shaft inlets. As such, the foregoing can be one advantage of using non-uniform outlets.

Figure 16:
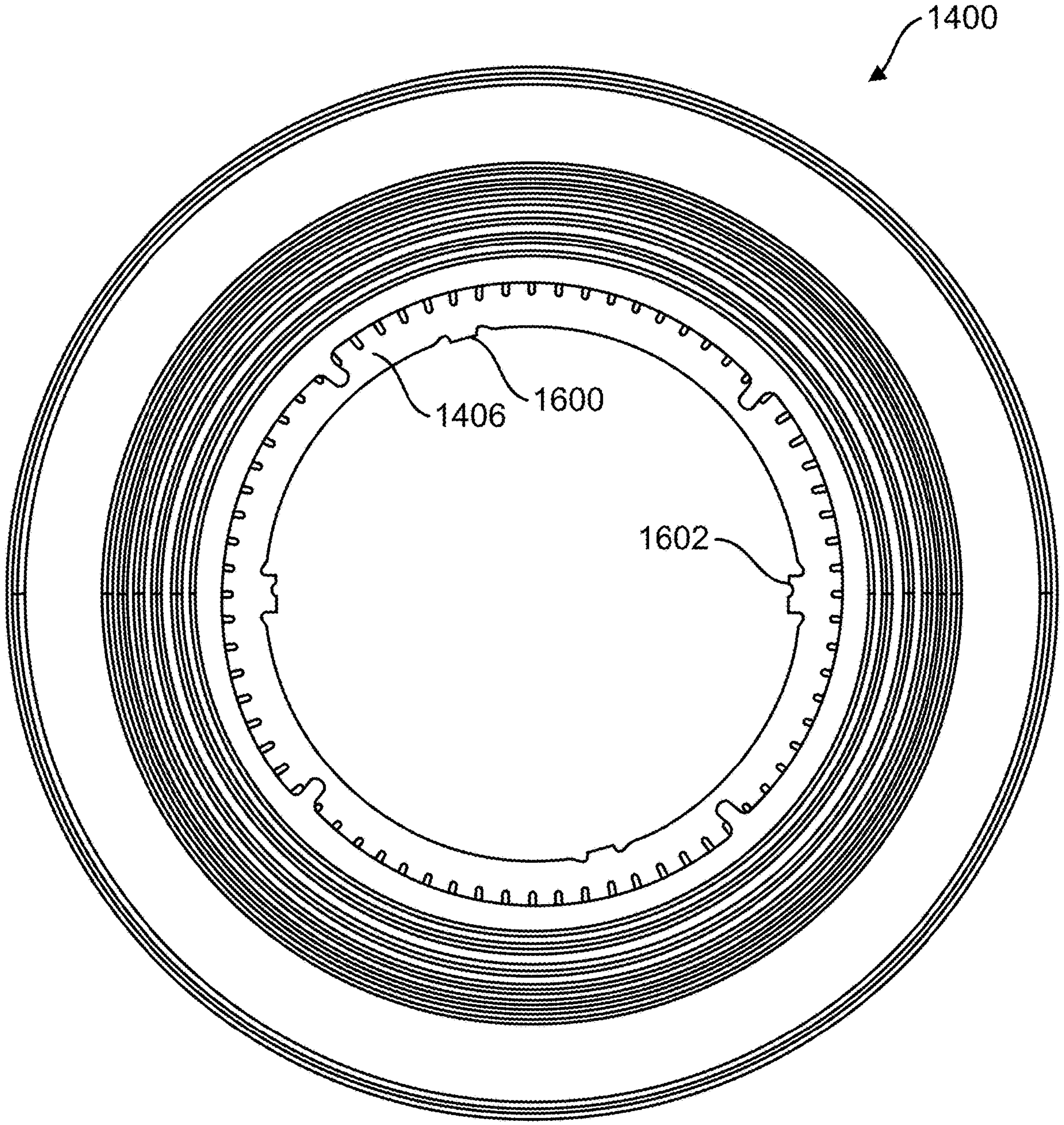
FIG. 16 shows an end view of the lamination stack of FIG. 14.

FIG. 16 shows an end view of the lamination stack 1400 of FIG. 14. This view further exemplifies the possible offset(s) that the end structure 1410 can provide. Also or instead, the laminations of the main portion 1406 can define one or more keys 1600, 1602. The keys 1600, 1602 can extend radially inward toward the rotor axis. For example, the keys 1600, 1602 can ensure that the lamination stack 1400 is installed properly onto the rotor shaft (e.g., by providing a so-called poka-yoke feature that matches with a corresponding structure on the rotor shaft).

Figure 17:
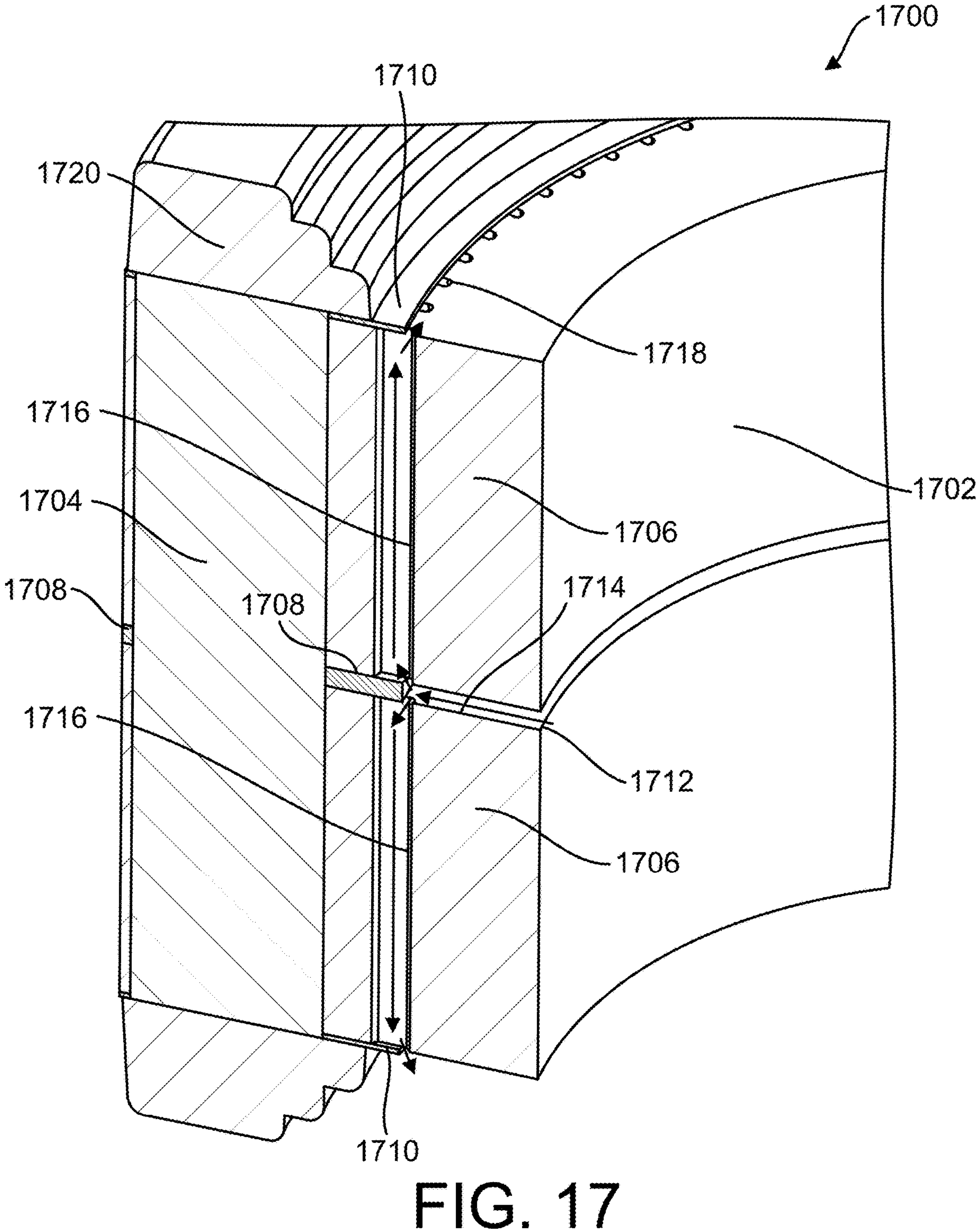
FIG. 17 shows another example of a lamination stack that can be used with an electric motor described elsewhere herein, the lamination stack using two types of lamination.

FIG. 17 shows another example of a lamination stack 1700 that can be used with an electric motor described elsewhere herein, the lamination stack 1700 using two types of lamination. The lamination stack 1700 can be used with one or more other examples described elsewhere herein. The lamination stack 1700 is being shown in cross section, and only a portion of the lamination stack 1700 is shown for clarity. A surface 1702 defines an inner diameter of a rotor shaft, and a bar 1704 can be part of a squirrel cage when the rotor is used in an induction motor.

The lamination stack 1700 is formed from a stack of individual rotor laminations. In some implementations, the lamination stack 1700 involves only two types of rotor laminations. A main portion 1706 of the rotor body can be formed from a first type of lamination; by contrast, a center portion 1708 of the rotor body, and end structures 1710 can be formed from a second type of lamination different from the first type of lamination. One or more of the main portion 1706, the center portion 1708, or the end structures 1710 can be formed by substacks of multiple instances of the respective type of lamination. For simplicity, each of the main portion 1706, the center portion 1708, and the end structures 1710 is here shown as an integral component without indicating the possible presence of multiple laminations therein. The second type of lamination is used only at ends of the rotor body (as the end structure 1710) and in an axial center of the rotor body (as the center portion 1708). A remainder of the rotor body (the main portion 1706) is formed of instances of the first type of lamination.

The rotor shaft can have at least one outlet 1712 from the hollow interior. In some implementations, the outlet 1712 is formed at the inner diameter of the rotor shaft. For example, the outlet 1712 can include a passage extending in a radial direction (e.g., substantially perpendicular to the rotor axis) away from the rotor axis. The outlet 1712 can facilitate that the fluid inside the hollow interior, after contacting the differential gears, can be centrifugally driven into a radial passage 1714. In some implementations, the radial passage 1714 is formed at least in part by the rotor body (e.g., by laminations thereof). For example, the second type of lamination can include an opening that is not present in the corresponding area of the first type of lamination, thus defining the radial passage 1714.

The rotor body includes an axial cooling channel 1716 that extends through the rotor body and is coupled to the radial passage 1714. The radial passage 1714 can be positioned at a center of the axial cooling channel 1716 along the rotor axis. The axial cooling channel 1716 can be, but is not necessarily, substantially parallel with the rotor axis. From the radial passage 1714, the fluid can be centrifugally flowed into the axial cooling channel 1716. The axial cooling channel 1716 can extend substantially from the axial center and in opposite directions toward each end of the rotor body. Each of the axial cooling channels 1716 has an elongate profile in cross section, the elongate profile extending in a radial direction from the rotor axis. The elongate profile can provide the axial cooling channel 1716 with a higher aspect ratio. For example, this can increase the wetted area and thereby increase the cooling of the rotor. The elongate profile of the axial cooling channel 1716 can have a lesser width than the elongate profile of the axial cooling channel 1416 in FIG. 14. In some implementations, each of the axial cooling channels 1716 forms an opening 1718 in end structure of the rotor body (e.g., in the first type of lamination forming the main portion 1706). The end structure 1710 formed by the second type of lamination partially covers the opening 1718 to form an outlet at the end structure 1710. For example, only the radially most inward portion of the opening 1718 is not covered by the end structure 1710. The outlet can be positioned radially inward of the axial cooling channel 1716. The outlet can be positioned radially outward of the outlet 1712 of the rotor shaft. For example, such position(s) can facilitate good coating of the inner surface of the axial cooling channel 1716. Having the outlet positioned radially outward of the outlet 1712 can provide a net centrifugal force to drive the flow. Having the outlet radially inward of the axial cooling channel 1716 can facilitate that the axial cooling channel 1716 is filled with liquid to provide a good coating of the inner surface of the axial cooling channel 1716. However, it is possible that 100% coverage with liquid on the inner walls of the axial cooling channel 1716 is not obtained; rather, the inner diameter walls that are more inner diameter than the outlet blockage, can be substantially free of liquid. The rotor can have an endring 1720.

Figure 18:
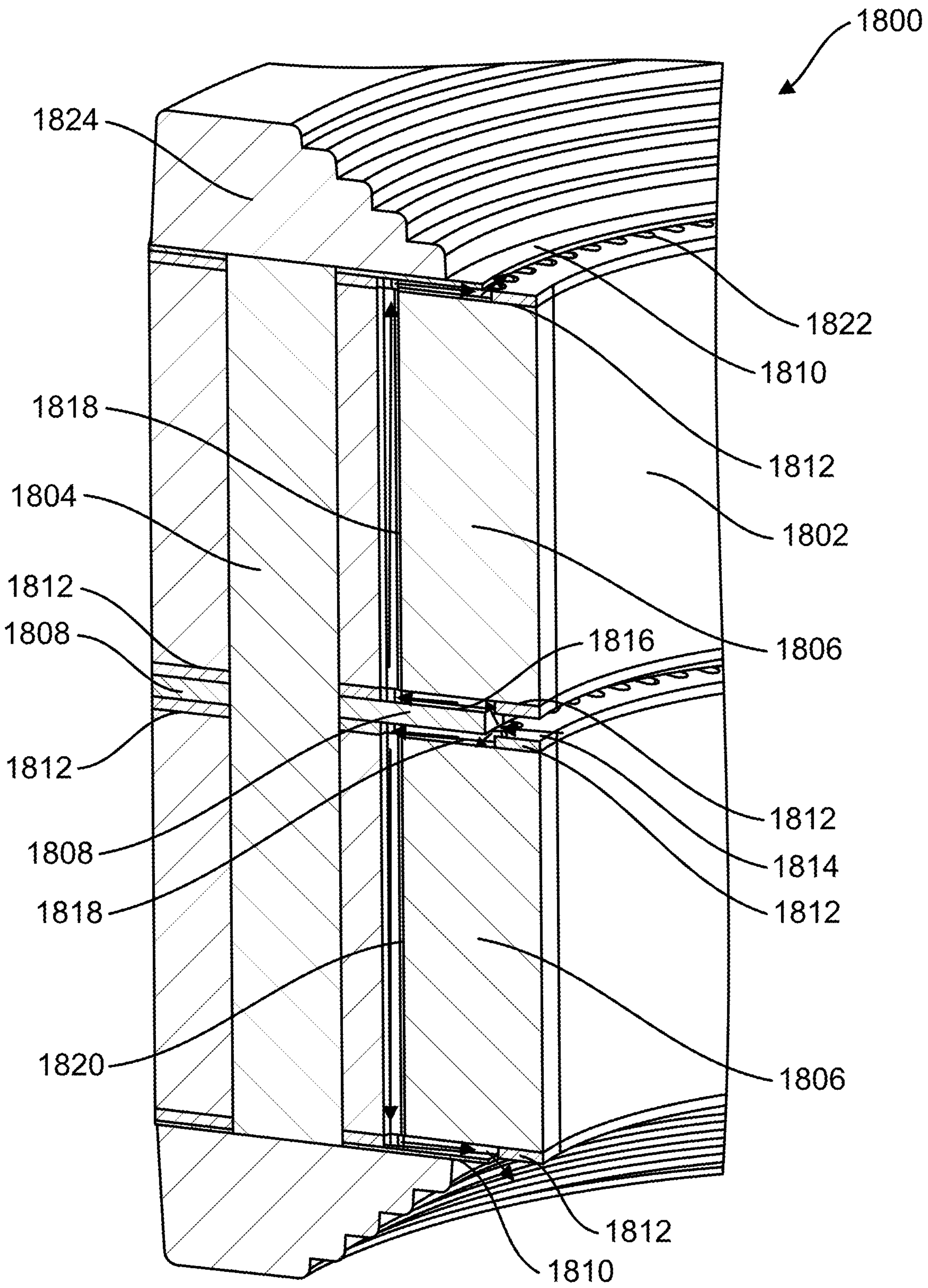
FIG. 18 shows another example of a lamination stack that can be used with an electric motor described elsewhere herein, the lamination stack using three types of lamination.

FIG. 18 shows another example of a lamination stack 1800 that can be used with an electric motor described elsewhere herein, the lamination stack 1800 using three types of lamination. The lamination stack 1800 can be used with one or more other examples described elsewhere herein. The lamination stack 1800 is being shown in cross section, and only a portion of the lamination stack 1800 is shown for clarity. A surface 1802 defines an inner diameter of a rotor shaft, and a bar 1804 can be part of a squirrel cage when the rotor is used in an induction motor. The lamination stack 1800 is formed from a stack of individual rotor laminations. In some implementations, the lamination stack 1800 involves only three types of rotor laminations. A main portion 1806 of the rotor body can be formed from a first type of lamination; a second type of lamination can be used in an axial center of the rotor body as a middle portion 1808 and at ends of the lamination stack 1800 as end structures 1810. A third type of lamination can be used as a transition portion 1812 between the first and second types of lamination. One or more of the main portion 1806, the middle portion 1808, the end structure 1810, or the transition portion 1812 can be formed by substacks of multiple instances of the respective type of lamination. For simplicity, each of the main portion 1806, the middle portion 1808, the end structure 1810, and the transition portion 1812 is here shown as an integral component without indicating the possible presence of multiple laminations therein.

The rotor shaft can have at least one outlet 1814 from the hollow interior. In some implementations, the outlet 1814 is formed at the inner diameter of the rotor shaft. For example, the outlet 1814 can include a passage extending in a radial direction (e.g., substantially perpendicular to the rotor axis) away from the rotor axis. The outlet 1814 can facilitate that the fluid inside the hollow interior, after contacting the differential gears, can be centrifugally driven into radial passages 1816 and 1818. The radial passages 1816 and 1818 are parallel paths for the fluid extending in a radial direction with regard to the rotor axis. In some implementations, the radial passages 1816 and 1818 are formed at least in part by the rotor body (e.g., by laminations thereof). For example, each of the second and third types of lamination can include a respective opening that is not present in the other, thus defining the radial passages 1816 and 1818.

The rotor body includes an axial cooling channel 1820 that extends through the rotor body and is coupled to the radial passages 1816 and 1818. The radial passages 1816 and 1818 can be positioned at a center of the axial cooling channel 1820 along the rotor axis. The axial cooling channel 1820 can be, but is not necessarily, substantially parallel with the rotor axis. From the radial passages 1816 and 1818, the fluid can be centrifugally flowed into the axial cooling channel 1820. The axial cooling channel 1820 can extend substantially from the axial center and in opposite directions toward each end of the rotor body. In some implementations, each of the transition portions 1812 serving as end structure of the rotor body forms an opening 1822. The opening 1822 can be coupled to an end of the axial cooling channel 1820. The opening 1822 can form an outlet in the end structure, the outlet positioned radially outward of the outlet 1814 of the rotor shaft. The end structure 1810 formed by the second type of lamination partially covers the opening 1822 to form an outlet at the end structure 1810. For example, only the radially most inward portion of the opening 1822 is not covered by the end structure 1810. The outlet can be positioned radially inward of the axial cooling channel 1820. The outlet can be positioned radially outward of the outlet 1814 of the rotor shaft. For example, such position(s) can facilitate good coating of the inner surface of the axial cooling channel 1820. Having the outlet positioned radially outward of the outlet 1814 can provide a net centrifugal force to drive the flow. Having the outlet radially inward of the axial cooling channel 1820 can facilitate that the axial cooling channel 1820 is filled with liquid to provide a good coating of the inner surface of the axial cooling channel 1820. The rotor can have an endring 1824.

Figure 19:
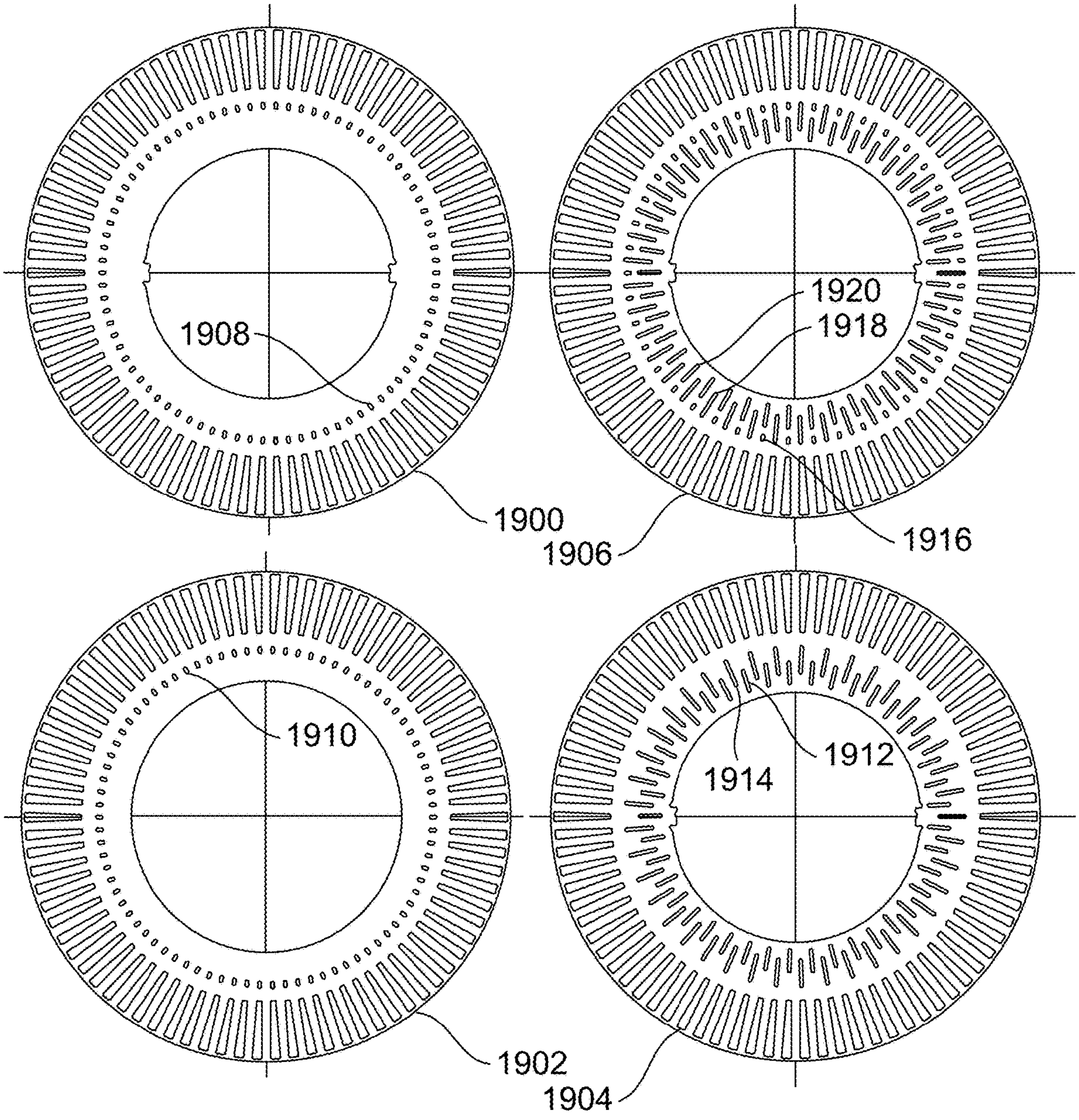
FIG. 19 shows examples of lamination types.

FIG. 19 shows examples of lamination types 1900-1906. The lamination type 1900 can be referred to as a main lamination. The lamination type 1902 can be referred to as an inlet lamination. The lamination type 1904 can be referred to as a transition lamination. The lamination type 1906 can be referred to as a connection lamination.

The lamination type 1900 includes openings 1908. The lamination type 1902 includes openings 1910. The lamination type 1904 includes openings 1912 and 1914. The lamination type 1906 includes openings 1916, 1918, and 1920.

Figure 20:
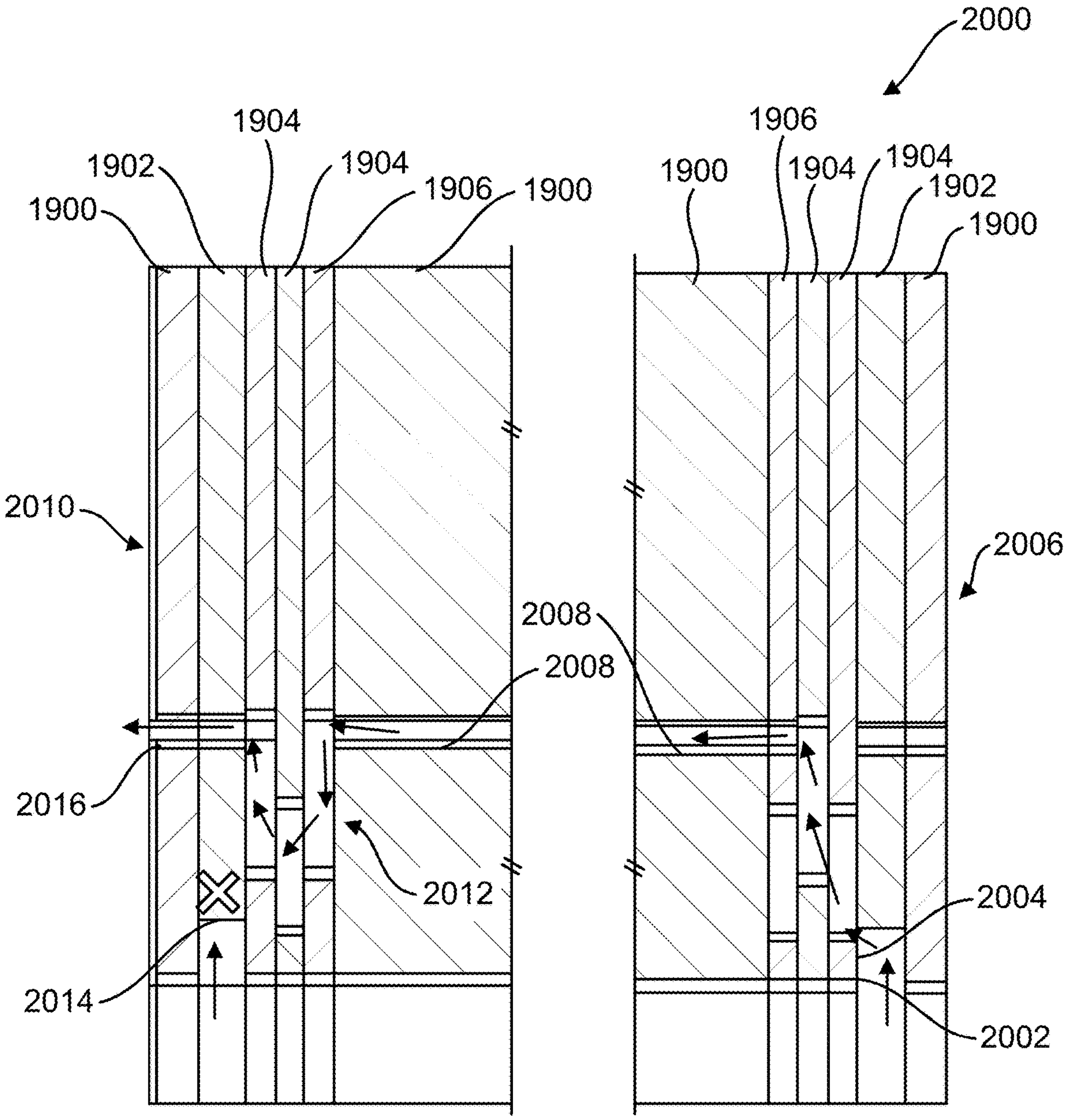
FIG. 20 shows an example of a lamination stack using four types of lamination that can be formed using the lamination types of FIG. 19.

FIG. 20 shows an example of a lamination stack 2000 using four types of lamination that can be formed using the lamination types 1900-1906 of FIG. 19. The lamination stack 2000 can be used with one or more other examples described elsewhere herein. The lamination stack 2000 is being shown in cross section, and only a portion of the lamination stack 2000 is shown for clarity. The lamination stack 2000 can be designed to facilitate cross-flow relative to each other between adjacent ones of multiple axial cooling channels, for example as will be described.

The rotor shaft can have at least one outlet 2002 from a hollow interior. In some implementations, the outlet 2002 is formed at the inner diameter of the rotor shaft. For example, the outlet 2002 can include a passage extending in a radial direction (e.g., substantially perpendicular to the rotor axis) away from the rotor axis. The outlet 2002 can facilitate that the fluid inside the hollow interior, after contacting the differential gears, can be centrifugally driven into a radial passage 2004. In some implementations, the radial passage 2004 is formed at least in part by the rotor body (e.g., by laminations thereof). For example, one type of lamination can include an opening that is not present in the corresponding area of another type of lamination, thus defining the radial passage 2004.

An order of the lamination types 1900-1906 in the lamination stack 2000 along the rotor axis can be as follows. At an end 2006 of the lamination stack 2000, a first instance of the lamination type 1900 can be positioned. The lamination type 1900 can be followed immediately by a first instance of the lamination type 1902. The lamination type 1902 can be followed immediately by a first instance of the lamination type 1904. The lamination type 1904 can be followed immediately by a second instance of the lamination type 1904. The first instance of the lamination type 1904 can have a rotated position relative to the second instance of the lamination type 1904. For example, the first instance of the lamination type 1904 can be rotated by about 180 degrees compared to the second instance of the lamination type 1904. The second instance of the lamination type 1904 can be followed immediately by a first instance of the lamination type 1906. The first instance of the lamination type 1906 can be followed immediately by a second instance of the lamination type 1900. For example, the second instance of the lamination type 1900 can be characterized as a main body of the lamination stack 2000. An axial cooling channel 2008 can be defined at least in part by the second instance of the lamination type 1900. The axial cooling channel 2008 can be, but is not necessarily, substantially parallel with the rotor axis.

Continuing the description in the same axial direction along the lamination stack 2000, the second instance of the lamination type 1900 can be followed immediately by a second instance of the lamination type 1906. The first instance of the lamination type 1906 can have a rotated position relative to the second instance of the lamination type 1906. For example, the first instance of the lamination type 1906 can be rotated by about 180 degrees compared to the second instance of the lamination type 1906. The second instance of the lamination type 1906 can be followed immediately by a third instance of the lamination type 1904. The third instance of the lamination type 1904 can have a same rotated position as the rotated position of the first instance of the lamination type 1904. For example, both of the third instance of the lamination type 1904 and the first instance of the lamination type 1904 can be rotated by about 180 degrees compared to the second instance of the lamination type 1904. The third instance of the lamination type 1904 can be followed immediately by a fourth instance of the lamination type 1904. The fourth instance of the lamination type 1904 can have a same rotated position as the rotated position of the second instance of the lamination type 1904. For example, both of the fourth instance of the lamination type 1904 and the second instance of the lamination type 1904 can be rotated by about 180 degrees compared to the second instance of the lamination type 1904. The fourth instance of the lamination type 1904 can be followed immediately by a second instance of the lamination type 1902. The second instance of the lamination type 1902 can be followed immediately by a third instance of the lamination type 1900. That is, the third instance of the lamination type 1900 can be positioned at an end 2010 of the lamination stack 2000 that is opposite from the end 2006.

The lamination stack 2000 is formed from a stack of individual rotor laminations. For simplicity, each instance of the lamination types 1900-1906 is here shown as an integral component without indicating the possible presence of multiple laminations therein. As such, at least one of any first, second, third or fourth instance can include multiple laminations.

The radial passage 2004 can be positioned at the end 2006 of the lamination stack 2000. From the radial passage 2004, the fluid can be centrifugally flowed into the axial cooling channel 2008. At the end 2010, the fluid can flow through a bypass 2012 to prevent the fluid from mixing with fluid that is to flow in the opposite direction (i.e., from the end 2010 toward the end 2006). A portion 2014 of the second instance of the lamination type 1902 is marked with an "X" in the drawing to schematically illustrate that no mixing occurs. Rather, fluid that flows through the bypass 2012 toward the end 2010 exits the lamination stack 2000 at an outlet 2016.

Figure 21:
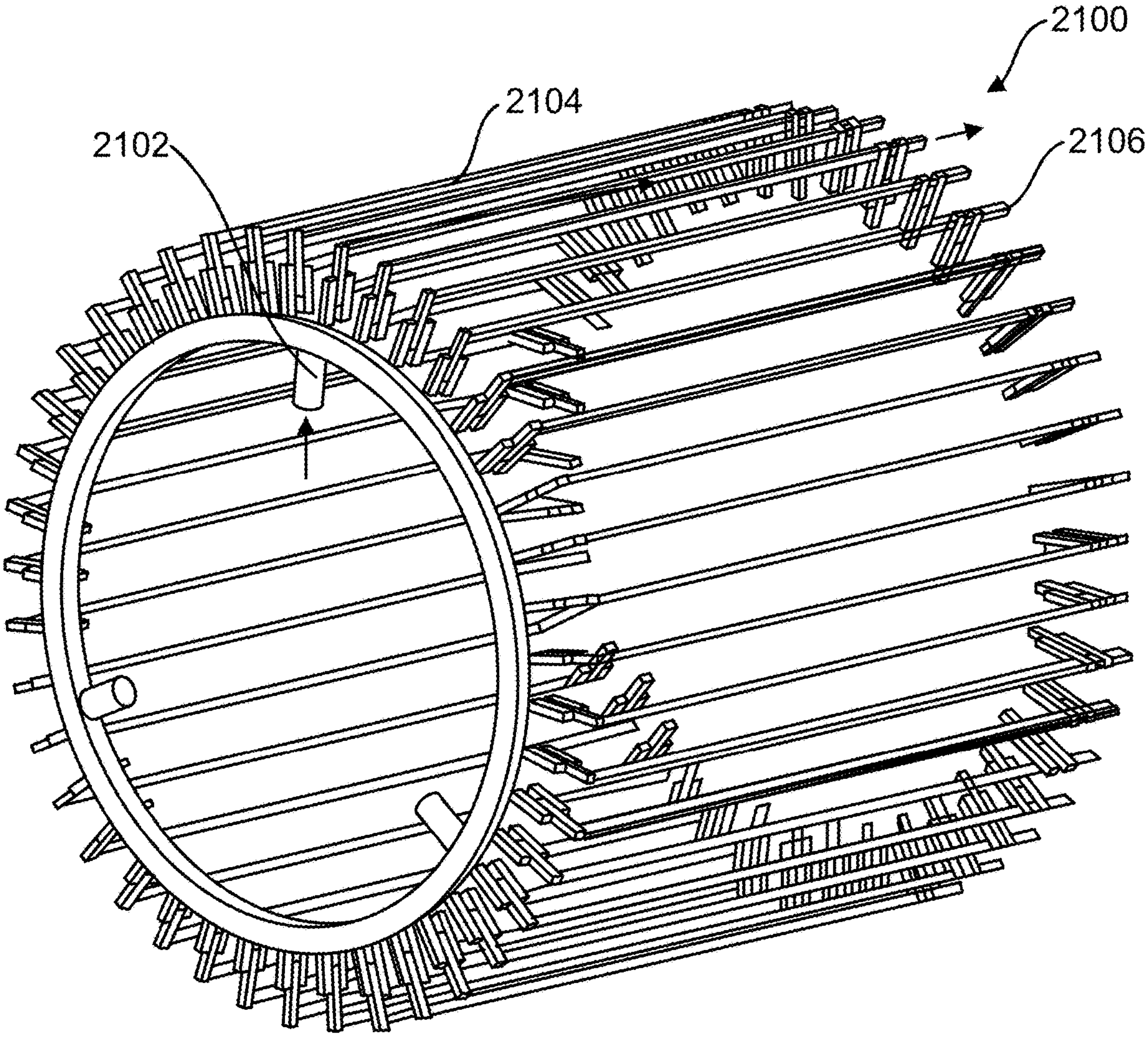
FIG. 21 shows an example of a fluid volume that can be formed by the lamination stack of FIG. 20.
Figure 22:
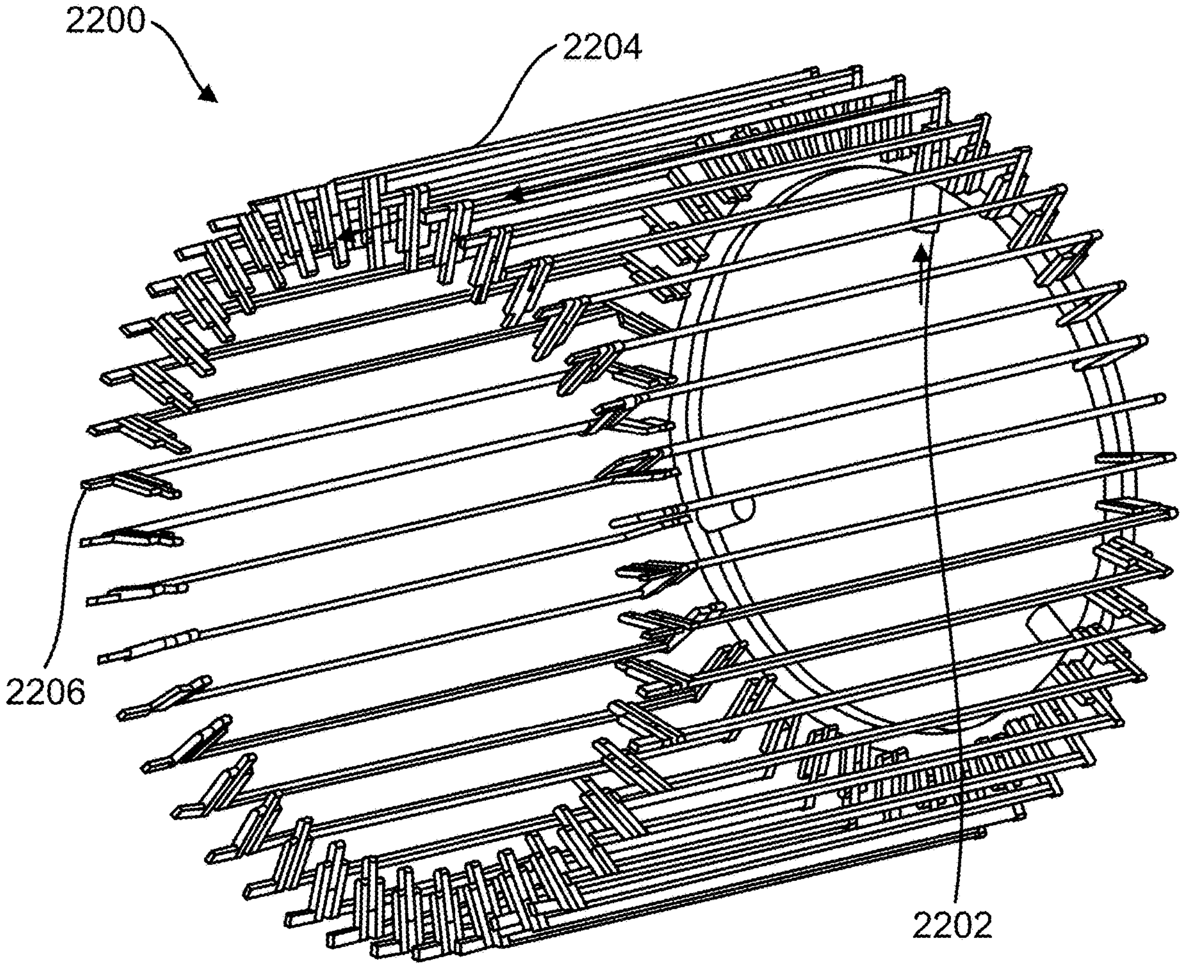
FIG. 22 shows another example of a fluid volume that can be formed by the lamination stack of FIG. 20.

FIG. 21 shows an example of a fluid volume 2100 that can be formed by the lamination stack 2000 of FIG. 20. FIG. 22 shows another example of a fluid volume 2200 that can be formed by the lamination stack 2000 of FIG. 20. The fluid volume 2100 and/or the fluid volume 2200 can be used with one or more other examples described elsewhere herein.

The fluid volumes 2100, 2200 schematically illustrate the shape that a fluid can form inside the lamination stack 2000 when flowing. That is, FIGS. 21-22 do not show structure of an electric motor but rather how a fluid (e.g., oil) can be centrifugally flowed for purposes of lubrication and/or thermal control.

The fluid volume 2100 can include one or more inlets 2102 oriented in a radial direction relative to a rotor axis, the inlet(s) 2102 corresponding to fluid being centrifugally flowed into the fluid volume 2100. For example, the inlet 2102 can be coupled to the outlet 514 from the hollow interior 506 in FIG. 5, or to any corresponding passage of another example described herein. The fluid volume 2100 can include axial cooling channels 2104 that can, but do not necessarily, extend substantially parallel to the rotor axis. The fluid volume 2100 can include one or more outlets 2106 at an opposite end of the axial cooling channel 2104. For example, the outlets 2106 can be oriented substantially in an axial direction.

The fluid volume 2200 can include one or more inlets 2202 oriented in a radial direction relative to a rotor axis, the inlet(s) 2202 corresponding to fluid being centrifugally flowed into the fluid volume 2200. The inlets 2202 are positioned at an opposite end of the lamination stack than the inlets 2102 in FIG. 21. For example, the inlet 2202 can be coupled to another outlet from a hollow interior of a rotor shaft than the outlet to which the inlet 2102 of FIG. 21 is coupled. The fluid volume 2200 can include axial cooling channels 2204 that can, but do not necessarily, extend substantially parallel to the rotor axis. The fluid volume 2200 can include one or more outlets 2206 at an opposite end of the axial cooling channel 2204. For example, the outlets 2206 can be oriented substantially in an axial direction. That is, fluid in the fluid volume 2200 flows in a direction parallel with the rotor axis, the direction being axially opposite to that of the flow of the fluid in the fluid volume 2100 of FIG. 21. In some implementations, each of the axial cooling channels 2204 of the fluid volume 2200 is positioned between two adjacent ones of the axial cooling channels 2104 of the fluid volume 2100 in FIG. 21. For example, this can provide cross-flow relative to each other between adjacent ones of multiple axial cooling channels.

Figure 23:
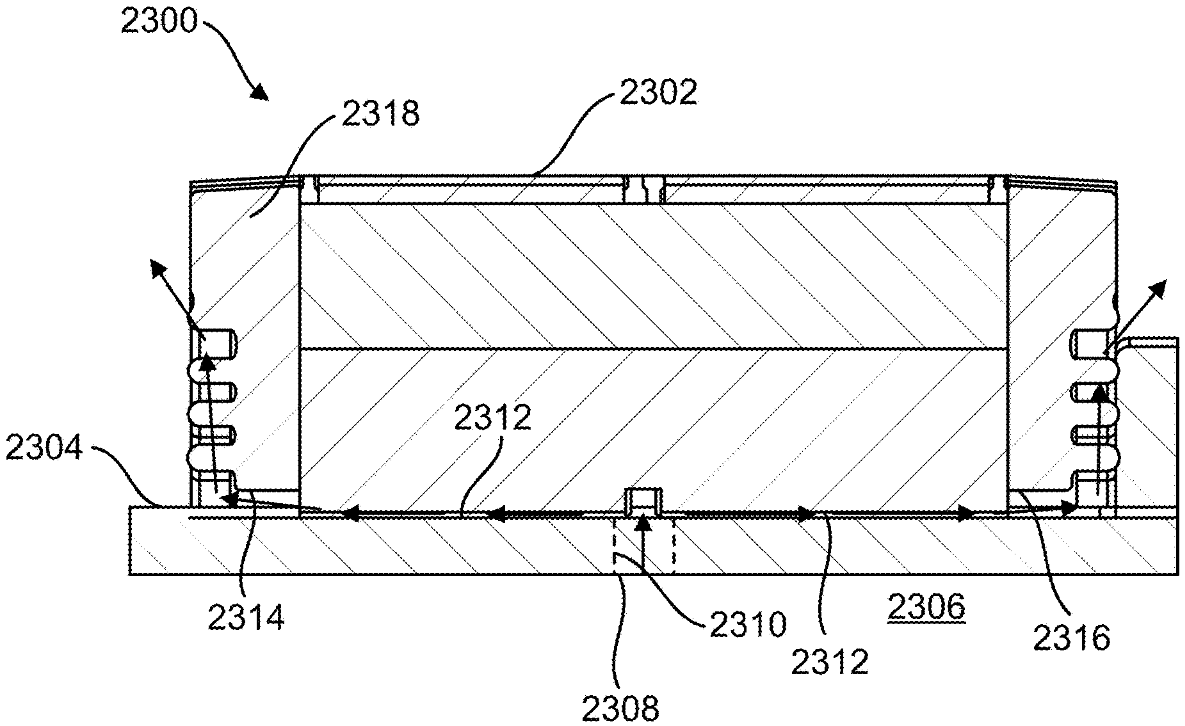
FIG. 23 schematically shows another example of an electric motor.
Figure 24:
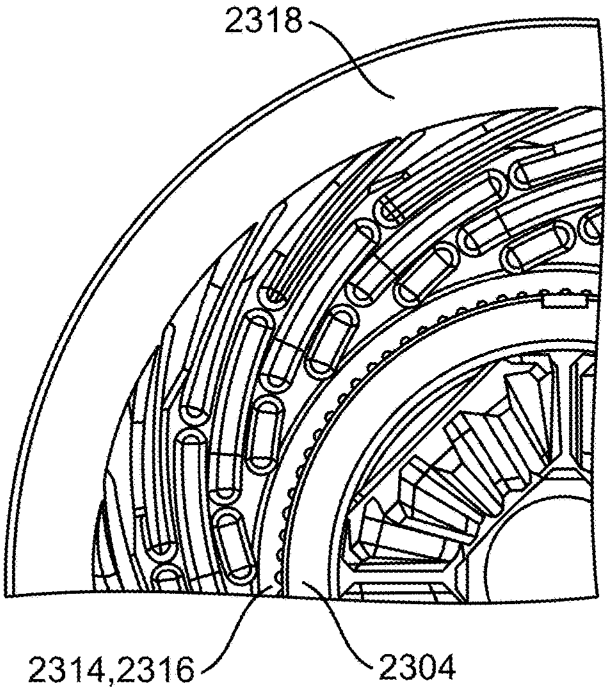
FIG. 24 shows an end view of the electric motor of FIG. 23.

FIG. 23 schematically shows another example of an electric motor 2300. FIG. 24 shows an end view of the electric motor 2300 of FIG. 23. The electric motor 2300 can be used with one or more other examples described elsewhere herein. Only portions of the electric motor 2300 are shown. For example, a transmission, a stator, and power electronics have been omitted for clarity. In the shown portions, the electric motor 2300 includes a rotor body 2302 (e.g., a stack of laminations) and a rotor shaft 2304. The rotor shaft 2304 has a hollow interior 2306 and is configured for rotation inside a stator about a rotor axis (not shown). Differential gears can be positioned in the hollow interior 2306 of the rotor shaft 2304. The rotor shaft 2304 can have at least one inlet into the hollow interior 2306. The rotor shaft 2304 can have at least one outlet 2308 from the hollow interior 2306. In some implementations, the outlet 2308 is formed at the inner diameter of the rotor shaft 2304. For example, the outlet 2308 can include a radial passage 2310 extending in a radial direction (e.g., substantially perpendicular to the rotor axis) away from the rotor axis. The outlet 2308 can facilitate that the fluid inside the hollow interior 2306, after contacting the differential gears, can be centrifugally driven into the radial passage 2310. In some implementations, the radial passage 2310 is formed at least in part by the rotor body 602 (e.g., by laminations thereof).

The electric motor 2300 includes an axial cooling channel 2312 that extends along the rotor axis and is coupled to the radial passage 2310. The axial cooling channel 2312 is positioned at an outer diameter of the rotor shaft 2304. For example, the axial cooling channel 2312 is formed between the rotor body 2302 and the rotor shaft 2304. At its respective ends, the axial cooling channel 2312 is coupled to outlets 2314 and 2316 formed in end structure of the rotor body 2302. The electric motor 2300 can have endrings 2318. Fluid can flow from each of the outlets 2314 and 2316 toward (e.g., onto) the endring 2318.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. An electric motor comprising:

a stator;

a rotor shaft having a hollow interior and configured for rotation inside the stator about a rotor axis, the rotor shaft having at least one inlet into the hollow interior and at least one outlet from the hollow interior to an outer diameter of the rotor shaft;

a rotor comprising:

a rotor body having a first end structure and a second end structure opposite each other along the rotor shaft, wherein the second end structure has an outlet to an outside of the rotor; and multiple axial cooling channels extending through the rotor body, wherein the electric motor is configured so that a fluid is centrifugally driven by rotation of the rotor to enter through the inlet of the rotor shaft, exit through the outlet of the rotor shaft, enter the multiple axial cooling channels, and flow to the outside of the rotor through the outlet of the second end structure, and wherein the second end structure partially covers respective openings of each of the multiple axial cooling channels, and wherein non-covered portions of the respective openings form the outlet to the outside of the rotor.

2. The electric motor of claim 1, wherein, the multiple axial cooling channels are substantially parallel with each other.

3. The electric motor of claim 1, wherein the rotor body comprises a stack of rotor laminations.

4. The electric motor of claim 3, wherein the rotor laminations consist of only a first type of lamination and a second type of lamination.

5. The electric motor of claim 4, wherein the outlet of the second end structure is positioned radially inward of the multiple axial cooling channels and radially outward of the outlet of the rotor shaft.

6. The electric motor of claim 4, wherein the first and second end structures are formed of the second type of lamination.

7. The electric motor of claim 6, wherein the second type of lamination is used only at ends of the rotor body, as the first and second end structures, and in an axial center of the rotor body, and wherein a remainder of the rotor body is formed of instances of the first type of lamination.

8. The electric motor of claim 4, wherein a beginning of each of the multiple axial cooling channels is at the first end structure and an end of each of the multiple axial cooling channels opposite the beginning is at the second end structure.

9. The electric motor of claim 4, wherein the fluid enters each of the multiple axial cooling channels through a radial passage at a center of the multiple axial cooling channels along the rotor axis, the radial passage being substantially perpendicular to the rotor axis, and wherein the fluid flows in opposite directions through respective first and second arms of the multiple axial cooling channels, the first arm having an end at the first end structure, the second arm having an end at the second end structure.

10. The electric motor of claim 1, wherein each of the multiple axial cooling channels has an elongate profile in cross section, the elongate profile extending in a radial direction from the rotor axis.

11. The electric motor of claim 1, further comprising tongues formed by the second end structure, each of the tongues oriented in a radial direction with regard to the rotor axis and extending between adjacent ones of the non-covered portions of the respective openings.

12. The electric motor of claim 11, wherein a first tongue and a second tongue of the tongues define a group of the non-covered portions of the respective openings, and wherein the second end structure provides an offset so that the non-covered portions of the respective openings in the group have different heights in the radial direction with regard to the rotor axis.

13. The electric motor of claim 12, wherein the offset comprises that the different heights of the non-covered portions of the respective openings in the group become greater in an opposite direction of a forward rotation direction of the electric motor.

14. The electric motor of claim 3, wherein the rotor laminations consist of only a first type of lamination, a second type of lamination, and a third type of lamination.

15. The electric motor of claim 14, wherein the second type of lamination is used at ends of the rotor body, as the first and second end structures, and in an axial center of the rotor body, wherein portions of the rotor body between the axial center and the ends are formed of instances of the first type of lamination, and wherein instances of the third type of lamination are used as transition laminations between the first and second types of lamination.

16. The electric motor of claim 3, wherein the rotor laminations consist of only a first type of lamination, a second type of lamination, a third type of lamination, and a fourth type of lamination.

17. The electric motor of claim 16, wherein the rotor body provides cross-flow relative to each other between adjacent ones of the multiple axial cooling channels.

18. The electric motor of claim 17, wherein a beginning of each of the multiple axial cooling channels is at one of the first or second end structures, and wherein an end of each of the multiple axial cooling channels opposite the beginning is at another one of the first or second end structures.

19. The electric motor of claim 18, wherein an order of the first, second, third and fourth types of lamination in the stack along the rotor axis is:

at an end of the stack, a first instance of the first type of lamination, followed immediately by a first instance of the second type of lamination, followed immediately by a first instance of the third type of lamination, followed immediately by a second instance of the third type of lamination, wherein the first instance of the third type of lamination has a rotated position relative to the second instance of the third type of lamination, the second instance of the third type of lamination followed immediately by a first instance of the fourth type of lamination, followed immediately by a second instance of the first type of lamination, followed immediately by a second instance of the fourth type of lamination, wherein the first instance of the fourth type of lamination has a rotated position relative to the second instance of the fourth type of lamination, the second instance of the fourth type of lamination followed immediately by a third instance of the third type of lamination, wherein the third instance of the third type of lamination has a same rotated position as the rotated position of the first instance of the third type of lamination, the third instance of the third type of lamination followed immediately by a fourth instance of the third type of lamination, wherein the fourth instance of the third type of lamination has a same rotated position as the second instance of the third type of lamination, the fourth instance of the third type of lamination followed immediately by a second instance of the second type of lamination, followed immediately by a third instance of the first type of lamination.

20. The electric motor of claim 1, wherein the non-covered portions forming the outlet to the outside of the rotor are positioned radially inward of the multiple axial cooling channels and radially outward of the outlet of the rotor shaft.

* * * * *